United States Patent [19]

Evans et al.

[11] 4,212,781

[45] Jul. 15, 1980

[54] MODIFIED EPOXY RESINS, PROCESSES FOR MAKING AND USING SAME AND SUBSTRATES COATED THEREWITH

[75] Inventors: James M. Evans, Panama City, Fla.; Vincent W. Ting, Brunswick, Ohio

[73] Assignee: SCM Corporation, Cleveland, Ohio

[21] Appl. No.: 788,611

[22] Filed: Apr. 18, 1977

Related U.S. Application Data

[63] Continuation-in-part of Ser. No. 685,246, May 11, 1976, abandoned.

[51] Int. Cl.$^2$ .................. C08L 61/28; C08L 63/00
[52] U.S. Cl. .................. 260/29.4 UA; 204/181 R; 260/29.2 EP; 260/29.2 UA; 260/29.2 N; 260/29.6 NR; 260/29.6 WB; 260/29.6 RB; 260/29.6 RW; 428/418; 428/460; 525/63; 525/69
[58] Field of Search ........... 260/836, 837 R, 29.4 UA, 260/29.2 EP, 29.2 UA, 29.2 N, 29.6 NR, 29.6 WB, 29.6 RB, 29.6 RW; 220/64, 1 BC; 525/63, 69

[56] References Cited

U.S. PATENT DOCUMENTS

| | | | |
|---|---|---|---|
| 3,028,359 | 4/1962 | Gaylord | 260/45.2 |
| 3,107,226 | 10/1963 | Tonner et al. | 260/23 |
| 3,110,695 | 11/1963 | Ceresa | 260/45.5 |
| 3,378,601 | 4/1968 | Tanaka et al. | 260/831 |
| 3,707,516 | 12/1972 | Walus | 260/21 |
| 3,816,557 | 6/1974 | Swanson et al. | 260/837 |
| 3,943,187 | 3/1976 | Wu | 260/837 R |

FOREIGN PATENT DOCUMENTS 956556  4/1964  United Kingdom .
1250734 10/1971 United Kingdom .

*Primary Examiner*—Theodore E. Pertilla
*Attorney, Agent, or Firm*—Irons & Sears

[57] ABSTRACT

Discloses a technique for modifying an epoxy resin by reacting with addition copolymerizable monomer in the presence of at least 3% of benzoyl peroxide at about 110° C. to 120° C., or the free radical initiating equivalent thereof. The reaction mixture obtained contains:
(a) unreacted epoxy resin;
(b) graft polymer; and
(c) associatively formed but ungrafted addition polymer.

The graft polymer is formed from the epoxy resin by the grafting of addition polymer onto aliphatic backbone carbons of the epoxy resin, such grafting being at carbons that have either one or two hydrogens bonded thereto in the ungrafted state. The process is useful for making polymer blends for coating compositions, and particularly, coatings for cans for foods and beverages, especially for beer. The coating compositions may be aqueous dispersions ready for spray application, or concentrate that can be made up readily into aqueous sprayable coating compositions. Solvent vehicles may also be used.

75 Claims, No Drawings

MODIFIED EPOXY RESINS, PROCESSES FOR MAKING AND USING SAME AND SUBSTRATES COATED THEREWITH

REFERENCE TO A RELATED APPLICATION

This application is a continuation-in-part of our co-pending application Ser. No. 685,246, filed May 11, 1976, abandoned, which is incorporated herein by reference.

BRIEF STATEMENT ABOUT THE INVENTION

This invention relates to novel resinous compositions that are particularly useful in coating compositions. More specifically, the invention is concerned with water-based coating compositions, and especially such compositions that are suitable for can coatings, particularly beverage cans. The invention is also concerned with processes for making the novel compositions, processes for using them, and with the coated objects that are produced.

BACKGROUND OF THE INVENTION

A major use for the epoxy resins is as surface coating materials. They combine toughness, flexibility, adhesion, and chemical resistance to a very desirable degree. However, they have inherent limitations that have restricted their use.

Coatings that contain no solvents have been prepared from very low molecular weight epoxy resins. The resin itself, in such coatings, serves as the wetting agent and as the vehicle for any pigments or fillers desired. Because there is no solvent, coatings of this type tend to be free from pinholes, but they have disadvantages such as brittleness, poor thermal stability, relatively high cost, and short pot life.

Coating compositions based on higher molecular weight epoxy resins have been prepared as solutions, formulated with solvent vehicle, curing agents and modifiers, and often, with pigments and opacifiers. The epoxy resin is often in the form of an ester, obtained by reacting the epoxy resin with a fatty acid, drying oil, or the like. While suitable for many purposes, expoxy ester-based coatings are vulnerable to caustic attack. The ester linkages are not considered to be as stable as would be desirable, for many applications.

In recent years there has been a trend toward water-based coating compositions containing epoxy resins, because of ease of handling and cleanup. Many attempts have been made to develop such coatings, and some of these have met with some success for particular applications. One promising area for the possible application of such coatings is for soft drink and beer cans. This application has always presented a challenge because of taste sensitivity. Can coatings in the past have tended to alter the product taste of canned beverages, in a variety of ways, sometimes by leaching of coating components into the beverage, sometimes by adsorption of flavor notes by the coating, sometimes by chemical reaction, and often by some combination of these. There is a commercially important, technically challenging, large potential application in can coatings for a water-based coating composition that is chemically stable, absolutely inert in taste response, easy to apply, and economically competitive, and that produces coatings that have all of the other demanding characteristics that are associated with that application, as reflected in the many prior art attempts to develop satisfactory products.

BROAD STATEMENT OF THE INVENTION

While this invention provides practical beverage can coating compositions that meet the long-felt needs of the beverage industry, the invention is also concerned with coating compositions generally, and with modified epoxy resin-based resinous materials from which coating compositions can be made.

In its broad aspects, this invention relates to a process for modifying an epoxy resin by reacting it and addition polymerizable monomer in the presence of at least 3% by weight of the monomer of benzoyl peroxide or the free radical initiating equivalent thereof at the reaction temperature, which is usually in the range from about 110° C. to about 120° C. This reaction leads to a reaction mixture containing a blend of resinous materials, including unreacted epoxy resin, a novel graft polymer, and associatively-formed but ungrafted addition polymer. The graft polymer has an epoxy resin component that has an addition polymer component grafted onto it at aliphatic backbone carbons of the epoxy resin that have either one or two hydrogens bonded thereto in the ungrafted state.

The grafting that occurs seems to have an important effect on the properties of coating compositions made from reaction mixtures of this type. For water-dispersible coatings, the addition polymerizable monomer is, at least in large part, an acrylic acid, and both the graft polymer and the ungrafted addition polymer are acid-functional as a result. In the presence of an ionizing agent, stable aqueous dispersions are readily prepared.

Such water-dispersed coatings are particularly useful for the formulation of can coatings for preserving items for human consumption. Coatings of this kind are often referred to as sanitary coatings, and these represent an important, preferred group of embodiments of the invention. A sanitary coating composition, in accordance with the present invention, is composed of a reaction mixture that includes acid-functional graft polymer and addition polymer, of particular compositions, respectively, dispersed in an aqueous vehicle with an ionizing agent. The ionizing agent is generally a basic-reacting material that is driven off under the conditions of cure, i.e., during baking, and such agents are therefore referred to as "fugitive".

When properly formulated, sanitary coatings prepared in accordance with this invention are highly suitable for use in beverage can coatings, and particularly in beer can coatings. Their outstanding advantages include ease of application and essentially complete inertness relative to taste, which advantages are especially important in beer can coatings.

DETAILED DESCRIPTION OF THE INVENTION

The present invention is based upon the somewhat surprising discovery that when an epoxy resin and addition polymerizable monomer are reacted together at an elevated temperature in the presence of at least 3% or more of benzoyl peroxide by weight of the monomer, or in the presence of the free radical initiating equivalent thereof at that temperature, grafting and addition polymerization go forward simultaneously. The grafting takes place at aliphatic carbons in the aliphatic backbone carbon chains of the epoxy resin that have either one or two hydrogens bonded thereto in the ungrafted state. The reaction mixture that is obtained, from a reaction of this type, includes graft polymer, associatively-formed but ungrafted addition polymer, and, as well, unreacted epoxy resin.

The grafting that occurs exerts a profound influence on the properties of the reaction mixture. Thus, when the addition polymerizable monomer includes a major amount of an acrylic acid, both the graft polymer and the ungrafted addition polymer, that are produced, are carboxylic acid-functional, and in the presence of an ionizing agent, the reaction product may be readily and stably dispersed in an aqueous vehicle. For satisfactory dispersion in an aqueous vehicle, the Acid Number of the reaction mixture should be sufficient for establishing and maintaining the polymer in the dispersion. For optimum curing results, a cross-linking agent is added to the dispersion such as, for example, an aminoplast.

The effects of graft polymerization in accordance with this invention can be observed, in the case of water-reducible coatings, when there is sufficient acid-functionality so that stable dispersions are formed. There are different ways in which this can be measured. Thus, the addition polymer, when formed from an acrylic acid-containing polymerizable monomer, will contain carboxylic acid units. These units should constitute at least 2% by weight of the graft polymer, for ease of dispersion. However, when the initial reaction mixture is low in either epoxy resin or in an acrylic acid, this measurement alone may not suffice. Accordingly, it is best to couple this measurement with an Acid Number value for the entire reaction mixture, which value should be above 30 and generally will not exceed 220. A preferred range is from about 45 to about 150, and a more preferred range, for sanitary coating composition binders, is from about 80 to about 90.

Even when the initial epoxy resin reactant constitutes a major part of the reaction mixture, surprisingly little grafting may take place, while nevertheless producing a reaction mixture which is apparently profoundly influenced by the presence of the novel graft polymer. Thus, the grafting of the addition polymer onto the epoxy resin may be as low as to the extent of 1½ parts by weight of addition polymer for 100 parts by weight of the epoxy resin. Generally, to secure the benefits of the invention, the amount of epoxy resin employed should be sufficient so that the epoxy resin constitutes at least 5% and preferably 10% of the initial weight of the reactants. Superior binder blends are obtained when the amount of epoxy resin is 40% or more by weight of the initial reactants, and 50% or more produces preferred binders, although for sanitary coating composition binders, the amount should be from 60% to 90%.

One important feature of the process of the invention is the amount of free radical initiator that is used in the reaction. The amount of benzoyl peroxide, used at about 110° C. to 120° C., must be at least 3% based on the weight of addition polymerizable monomer, preferably at least 4%. A preferred practical range is 6% to 7%, although up to 15% or more can be used. When other free radical initiators are used, the amount can be adjusted to be equivalent in activity for this particular reaction, taking the temperature of use into account.

When the amount of free radical initiator employed is less than 3% by weight of benzoyl peroxide or equivalent, ester-type graft polymers apparently are formed. When the amount of peroxide-type free radical initiator is sufficient to be the equivalent of at least 3% or more by weight of benzoyl peroxide, and of up to about 7% or more by weight of benzoyl peroxide, the predominant type of grafting that occurs is at those aliphatic carbons in aliphatic backbone carbon chains of the epoxy resin component that have either one or two hydrogens bonded thereto in the ungrafted state. When a greater amount of peroxide-type free radical initiator is employed, than the equivalent of about 7% of benzoyl peroxide at 110° C. to 120° C., generally greater expense is incurred without any accompanying advantage.

While the preferred reaction technique involves placing the epoxy component and a solvent for it in a reactor, and then slowly adding the monomer mixture, catalyst, and solvent, over a period of time that permits facility of control over the exothermic heat, other approaches to the process can be employed. For example, the epoxy resin and a solvent for it could be placed in a reactor, then all of the catalyst and part of the monomer mixture could be added. After an initial reaction, taking place upon heating, the remainder of the monomer mixture could be added slowly over a period of time. As a variation on this process, some of the catalyst might be retained for addition to the reactor along with the monomer mixture. As a further alternative, the monomer mixture, epoxy resin component, and any desired solvents, could be placed in a reactor, and the catalyst added slowly.

Once the final reaction product is obtained, it is generally useful to suspend it in an aqueous vehicle, to facilitate its application as a coating composition.

The process of converting the polymeric blend and solvent system to a stable water-borne system requires the utilization of a base or mixtures of bases. The preferred neutralizing base is dimethyl ethanol amine and it is normally used at 4% to 12% by weight based on the total weight of polymer. The amount of base used determines the resulting viscosity of the water-borne system, which in turn affects application characteristics. Higher levels of base give higher viscosities and require larger amounts of water dilution for viscosity control.

Two different processing procedures can be used to convert the reaction product blend to a stable water-borne system. For ease of manufacture, the preferred procedure involves adding the product blend with solvent to a mixture of water and dimethyl ethanol amine, with mixing. Usually a small amount of solvent (ethylene glycol monobutyl ether) is included in the water to aid solubilization.

In the second procedure, water and amine are added to the product blend and solvent, with mixing. While the water-borne system prepared by this process is satisfactory as to quality, this procedure is not preferred for best equipment utilization.

Water-borne systems prepared as described above normally have a pH in the range from about 7.5 to 8.0, and have been found to be stable for storage periods of over one year. Products so produced do not change unduly in viscosity, there is little or no settling or separation, and application characteristics remain satisfactory after storage.

To operate within the most preferred ranges for practicing the present invention, for the production of sanitary coating compositions for soft drink and beer cans, the amount of diepoxide resin should preferably be about 80% by weight, and the amount of monomer mixture employed, for reaction with the epoxy component, should be about 20% by weight. The amount of benzoyl peroxide present during the reaction should be from about 6% to about 7% by weight, and preferably, about 6.7% to 6.8%. The amount of methacrylic acid in the monomer mixture is reflected in the Acid Number of the final reaction product mixture that is obtained. For present purposes, this Acid Number should be in the range from 45 to 150, and preferably, from about 80 to 90, and most preferably, about 85.

For a beverage can coating composition, for use in an 80 parts of diepoxide to 20 parts of monomer mixture reaction mixture, with 6.8 parts benzoyl peroxide, a preferred monomer mixture composition is 70 parts methacrylic acid to 30 parts styrene with one mole percent ethyl acrylate. The final reaction product mixture obtained should have all of the monomer mixture copolymerized to an addition copolymer, with parts grafted to the diepoxide resin, at aliphatic backbone carbons, and with the balance of the addition copolymer blended with the graft polymer in the reaction product mixture.

Both the graft polymer and the addition copolymer thus produced are carboxylic acid-functional. They have enough ionization potential to be hydrophilic and are readily blendable.

Generally the reaction product mixture obtained, from the 80/20 preferred reaction mixture of diepoxide resin to monomer mixture, will contain ungrafted addition copolymer. For many coating applications, even more addition copolymer can be tolerated, and separately formed compatible addition copolymer, preferably of substantially the same composition as that present, can be added, up to a total of about 40 or so parts of ungrafted addition copolymer in the reaction product mixture. Similarly, additional ungrafted diepoxide resin can be tolerated, generally up to a total of about 10% by weight of the reaction product mixture.

For aqueous dispersions at high epoxy contents, the carboxyl content of the reaction mixture, measured as -COOH, should be at least 2% by weight of the reaction mixture. For stability of dispersion, the amount may be substantially higher. The practical range is at least about 5%, generally. When the carboxyl content is below about 2%, polymer blends are produced that are useful in solvent vehicles.

The several individual features of the invention will now be discussed in detail.

THE EPOXY RESIN

The epoxy resin may be either aliphatic or aromatic. For preparing coating compositions for cans in which terms suitable for human consumption are preserved, the aromatic epoxy resins are preferred.

The most preferred epoxy resins are polygylcidyl ethers of bisphenol A, especially those having 1,2-epoxy equivalency of from about 1.3 to about 2, and preferably about 2. The molecular weight should be from about 350 to about 20,000, and preferably, for sanitary coating compositions, from about 4,000 to about 10,000. Low molecular weight epoxy resins are ordinarily selected for use when the epoxy resin content of the polymeric binder is to be low, that is, from about 10% to about 30% by weight. Low molecular weight epoxy resins are considered to be those having a molecular weight of less than 1,000.

Ordinarily, when the polymeric blend is intended to contain from 50% to 90% by weight of epoxy resin based on total polymer solids, the epoxy resin selected will be one having a molecular weight in the range from about 4,000 to about 10,000, particularly for the preparation of sanitary coating compositions, for which it is preferred that the epoxy resin contribute at least 60% of total solids.

While it is sometimes convenient to use a finished epoxy resin at the desired molecular weight, it is often more practical to start with bisphenol A and the bisglycidyl ether of bisphenol A, which is available from commercial sources. The bisglycidyl ether of bisphenol A, known generally as liquid epoxy resin, is available in precatalyzed form not only from Dow Chemical Co. under the trade name DER-333, containing as the catalyst the complex of ethyl triphenyl phosphonium acetate with acetic acid, but also from Shell Chemical Co. under the trade name Epon 829, and these are convenient initial starting materials. Uncatalyzed liquid epoxy resins are also available and have been found to be suitable for use when the proper catalyst is employed.

The precatalyzed liquid epoxy resin from Dow Chemical Co., DER-333, has the following physical properties:

Table I

| Properties of DER-333 Epoxy Resin | |
| --- | --- |
| Appearance | Clear, viscous liquid |
| Color (Gardner) | 1–2 |
| Specific gravity | 1.15 |
| Weight per gallon | 9.65 |
| Nonvolatile by weight | 96±1% |
| Volatile | Xylene |
| Nonvolatile by volume | 95% avg. |
| Viscosity at 25° C. | 2300–4600 cps. |
| Epoxide equivalent weight* | 199–202 |

*Epoxide equivalent weight is the grams of resin containing one gram equivalent weight of epoxide.

To increase the initial molecular weight of a liquid epoxy resin to a level that is more satisfactory for many coating applications, the initial liquid epoxy resin may be reacted not only with additional bisphenol A but also with other materials. Other polyfunctional aromatic alcohols can be used to make the glycidyl ether and to increase molecular weight, including such materials as bis(4-hydroxyphenyl)methane; bisphenol F; 2,2-bis(4'-hydroxy-2', 3', 5', 6'-tetrachlorophenyl)propane; tetrachlorobisphenol A; 4,4-bis(hydroxyphenyl)pentanoic acid; diphenolic acid; novolacs or low molecular weight phenol-formaldehyde polymers; 1,8-bis(hydroxyphenyl)pentadecane; resorcinol; 2,2,5,5,-tetrakis(4'-hydroxyphenyl)hexane; and others. However, the preferred material, for simple practical control over the process, for increasing the weight of the initial liquid epoxy resin, is bisphenol A.

The ratio of bisphenol A to DER-333 used to produce the most desirable molecular weight is from 65% to 66.5% by weight DER-333 and 35% to 33.5% by weight bisphenol A. The following table lists the characteristics of the finished epoxy resins:

Table II

| Epoxy Resin Starting Materials for Grafting | | |
| --- | --- | --- |
| DER-333 level by wt. | 65 | 66.5 |
| Bisphenol A level by wt. | 35 | 33.5 |
| Approximate molecular wt. | 9000 | 5000 |
| % Epoxide oxygen | .4 | .6 |
| Gardner viscosity range at 40% wt. nv. in ethyleneglycol mono butyl ether | $Z_1$–$Z_3$ | X–$Z_1$ |

The reaction conditions employed to increase the molecular weight of the liquid epoxy resin, or other low molecular weight epoxy resins, include a reaction temperature of about 175° C. and atmospheric pressure.

While this reaction can be conducted without a solvent, it is preferred to use ethylene glycol mono butyl ether at about 15% by weight based on total reaction charge.

For many coating applications, the epoxy resin, ordinarily a diepoxide, may have a molecular weight in the range from about 350 to about 20,000. However, for more demanding applications, particularly for applications where the end product is to be a sanitary coating, epoxy resin molecular weight values in the range from about 4,000 to about 10,000 are preferred. These and other molecular weight determinations of the epoxy resin components are made by gel permeation chromatography, preferably, but any other standard technique may be employed.

Epoxy resin that are useful also can be modified with other condensates such as phenolic resins, phenols, and polyols. Typical modified epoxy resins are: epoxidized polybutadiene; glycidyl ethers formed by reacting phenol novolak resins with epichlorohydrin; 4,4'-isopropylidenediphenol-epichlorohydrin or 4,4-sec-butylidenediphenol-epichlorohydrin reacted with one or more of the following drying oils or fatty acids; beechnut, candlenut, castor (including dehydrated), tung, coconut, corn, cottonseed, fish (refined), hempseed, linseed, oiticica, perilla, poppyseed, pumpkinseed, safflower, sesame, soybean, sunflower, tall oil, and walnut; 4,4'-isopropylidenediphenol-epichlorohydrin chemically treated with one or more of the following: allyl ether of mono-, di-, or trimethylol phenol; 4,4'-isopropylidenediphenol-formaldehyde, 4,4'-sec-butylidenediphenol-formaldehyde, melamine formaldehyde, and urea-formaldehyde.

Commercial epoxy resins that have useful molecular weight values and that are suitable for use as is, without further increase in molecular weight, including DER 662, 664, 667, 668, and 669, all products of Dow Chemical Co. (with calculated average molecular weights, respectively, of 1,275; 1,850; 3,600; 5,500; and 9,000); and EPON 836, 1007 and 1009, all products of Shell Chemical Co. (with calculated average molecular weights, respectively, of 625; 4,500; and 6,500).

While preferred diepoxide materials, for use in the practice of the invention, are prepared by reacting epichlorohydrin with bisphenol A, other satisfactory diepoxides include such initial materials as the following, provided the molecular weights are adjusted to the proper range;

Diepoxide 1

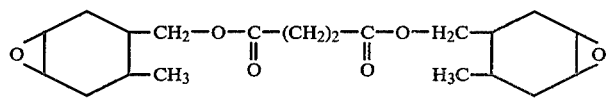

Diepoxide 2

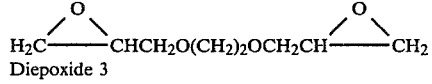

Diepoxide 3

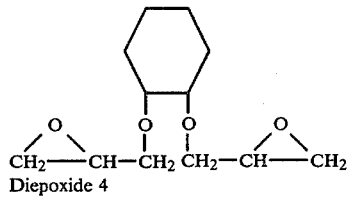

Diepoxide 4

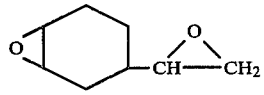

Diepoxide 5

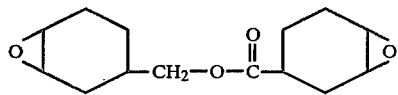

Diepoxide 6

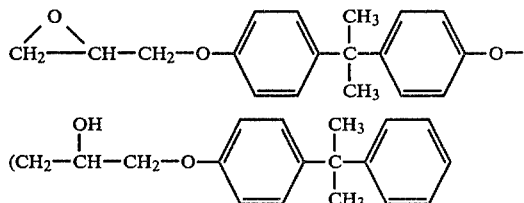

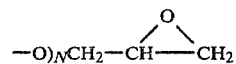

N = 0, 1 or more

A further way of characterizing the epoxy resin component is in terms of its oxirane content. This value can be anything from zero to about 8%. A zero value oxirane content would indicate that the epoxy groups have been completely reacted, as, for example, with excess bisphenol A. The epoxy groups may not be needed for applications other than for good can coatings. The oxirane content is determined in the following way.

DETERMINATION OF OXIRANE CONTENT

A sample of known weight is placed into a 50 milliliter Erlenmeyer flask, and dissolved in 10 milliliters of chlorobenzene. To the solution is added 10 milliliters of tetraethylammonium bromide solution and 2 to 3 drops of 2% crystal violet indicator solution in glacial acetic acid. The resulting solution is then titrated to blue-green end point with a standardized 0.1 N perchloric acid (HClO$_4$) using a 10 milliliter microburet. % oxirane is calculated from the following equation:

$$\% \text{ Oxirane} = \frac{(\text{ml.} \times \text{N of HClO}_4) \times 1.600}{\text{Wt. of sample in grams}}$$

The 0.1 N HClO$_4$ solution was prepared by mixing 8.5 ml. of 72% HClO$_4$ with 300 ml. of glacial acetic acid (99.5%), 20 ml. of acetic anhydride was added, and the solution was diluted to 1 liter with glacial acetic acid and allowed to stand overnight. It was then standardized against potassium acid phthalate.

The tetraethylammonium bromide solution required above was prepared by dissolving 100 g. of tetraethylammonium bromide in 400 ml. of glacial acetic acid (99.5%). To neutralize basic impurities, a few drops of 2% crystal violet indicator solution was added and the solution was titrated dropwise with the standard 0.1 HClO$_4$ to the end point color change.

This determination is applicable to both the initial epoxy resin and to the reaction mixture that includes the graft polymer.

ADDITION POLYMERIZABLE MONOMER

The second important group of materials, for use in practicing the present invention, consists of addition polymerizable materials.

To practice the present invention in its broadest aspects, the addition polymerizable monomer, that is reacted in the presence of the epoxy resin and the free radical initiator to form the reaction mixture including the graft polymer, may be a single monomer, or a mixture of copolymerizable monomers. The material selected will depend upon the objectives to be achieved in terms of properties and economics. Styrene is a valuable monomer, for example, because it acts as an extender and is economical. Acrylamide is interesting because it enhances self-curing capability, whether used alone or as a part of a monomer mixture. The acrylic acids impart acid functionally.

Currently approved epoxy-acrylic coatings for beverage can use include three or more monomers in admixture, i.e., styrene, methacrylic acid, and ethyl acrylate, and optionally, methyl methacrylate. However, very useful water-reducible coatings can be produced from mixtures of methacrylic acid and styrene, the acid normally being the major component, to develop sufficient acid functionality for forming stable aqueous dispersions.

Generally, for making coating compositions in accordance with the present invention, the addition polymerizable monomer will be selected from among three general classes of such monomeric materials. The selection may be a single monomer, or a mixture of such monomers that is designed to achieve some particular objective such as, for example, acid functionality.

The first class of monomers, that may be used in the preparation of coating compositions, are the acrylic acids. This category includes true acrylic acid and lower alkyl substituted acrylic acids, that is, those acids having ethylenic unsaturation in a position that is alpha, beta to a single carboxylic acid group. The preferred acrylic acid is methacrylic acid.

A second class of monomer that may be employed can be identified as including those readily commercial available monomers that have vinyl unsaturation and that do not impart functionality. This would include styrenic monomers such as styrene, vinyl toluene, and divinyl benzene. Other suitable monomers include isoprene, conjugated butadiene, and the like.

A third class of monomers that are useful, particularly to comply with current regulations that apply to sanitary coatings for addition to a methacrylic acid-styrene mixture, are the alkyl esters of an acrylic acid, generally the lower alkyl esters, that is, those esters in which the esterifying group contains from 1 to 4 carbon atoms, and particularly, ethyl acrylate. Other useful monomers in this class include other C$_{1-15}$ alkyl acrylate esters and methacrylate esters such as, for example, propyl acrylate, isopropyl acrylate, butyl acrylate, isobutyl acrylate, tertiary butyl acrylate, pentyl acrylate, decyl acrylate, lauryl acrylate, isobornyl acrylate, methyl methacrylate, butyl methacrylate, isobutyl methacrylate, hexyl methacrylate, 2-ethyl hexyl methacrylate, octyl methacrylate, and nonyl methacrylate. Acrylamide and acrylonitrile are also useful, although not for foods.

Generally, those addition polymerizable monomers that are readily polymerizable under emulsion polymerization conditions, typically those that contain ethylenic unsaturation, are suitable for use. This would include acetylenically unsaturated materials such as, for example, acetylenic glycols. When a mixture of monomers is used in the production of a water-reducible coating, those monomers selected, other than an acrylic acid monomer, should copolymerize well with acrylic acid monomers, and should form copolymers that by themselves are not cross-linked.

For most water-reducible coating compositions, generally the monomer mixture will contain a major proportion of an acrylic acid, and a minor proportion of a styrenic monomer, generally styrene. For those coating compositions that may come in contact with food, in general, and for the preparation of beer can coating compositions in particular, one preferred addition polymerizable monomer mixture is made from 70 parts by weight of methacrylic acid to 30 parts by weight of styrene, together with 1 weight percent of ethyl acrylate. Another preferred monomer mixture includes methacrylic acid, styrene, and ethyl acrylate, in the approximate weight ratio of 65:34:1, respectively.

FREE RADICAL INITIATOR

The epoxy resin and the mixture of polymerizable monomer are reacted together in the presence of a free radical initiator, preferably of the peroxide type.

Many free radical initiating materials may be used, but benzoyl peroxide is preferred. Those materials that may be used generally include the materials often referred to as peroxide-type catalysts. The class of free radical initiators is generally well-known and is generally useful to some degree, including combinations of free radical initiators and activators for the free radical initiators, including ultraviolet light and high energy electron beams, under proper conditions. Typical, practical free radical initiators that are in common use include cumene hydroperoxide, benzoyl peroxide, t-butyl perbenzoate, t-butyl peroxide, lauroyl peroxide, methyl ethyl ketone peroxide, chlorobenzoyl peroxide, and the like. Benzoyl peroxide is preferred as the free radical initiator for use in the practice of the present invention to initiate and to conduct grafting and addition polymerization together.

The amount of free radical initiating activity is important. That amount is expressed herein in terms of percentage by weight of benzoyl peroxide based on the total weight of the polymerizable monomer, or equivalent, at the temperature of use, which is generally from about 110° C. to 120° C. The amount should be at least 3%, and preferably more than 4%, by weight of benzoyl peroxide or equivalent. Since benzoyl peroxide is an expensive material, no more should be used than is necessary to produce the desired results.

When the amount of benzoyl peroxide or equivalent used is about 3% on monomer, minimum grafting occurs. As the amount of free radical initiator used is increased, grafting at the aliphatic backbone carbons is favored. At a level of free radical initiator equivalent to 6%–7% of benzoyl peroxide based on polymerizable monomer, with a reaction mixture of about 80% by weight epoxy resin to 20% polymerizable monomer by weight, the initial monomer grafts to the epoxy onto aliphatic backbone carbons that have either one or two hydrogens bonded thereto in the ungrafted state. This type of grafting can be illustrated thus:

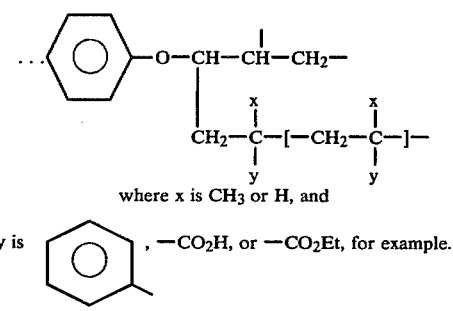

where x is $CH_3$ or H, and y is phenyl, $-CO_2H$, or $-CO_2Et$, for example.

Actually a sizable percentage of the epoxy resin may not be grafted, but the free epoxy is difficult to detect; it may even be as much as 50% of the original that remains ungrafted.

THE REACTION PROCESS

The reaction generally consists of reacting the epoxy resin component with polymerizable monomer that constitutes from about 5% to about 95% of the reaction mixture by weight, in the presence of at least 3% of benzoyl peroxide by weight of the monomer, or the free radical initiating equivalent thereof. While the reaction may be conducted in the absence of a solvent, ordinarily a solvent system is employed for coating production. A preferred solvent system is one made up of two miscible solvents, one of which dissolves the epoxy resin and the other of which dissolves the monomer.

A preferred technique for conducting the reaction is to place a solution of the epoxy resin in a reactor, heat, and then slowly add, over a period of two or three hours, with agitation, the polymerizable monomer, a solvent, and the free radical initiator. Since the reaction is exothermic, this technique enables the temperature to be maintained at a desired reaction level with some degree of control. At the end of the addition to the reactor, the contents of the reactor may be maintained at a preselected holding temperature for some additional period of time, to make sure that the reaction has gone forward to the desired extent.

The particular solvents that may be employed are well known in the art. Solvents such as xylene are satisfactory for the epoxy resin component. Other suitable solvents include benzene, ethyl benzene, toluene, and the alkoxy alkanols. For the monomer, alcohols such as methanol, ethanol, propanol, butanol, and the like, are suitable, with butanol being preferred. Ethylene glycol monobutyl ether, ethylene glycol monobutyl ether acetate, and the like, hexane, mineral spirits, and the like, are also suitable. If the end product is to be used in an aqueous vehicle, then the solvents selected should be water-soluble materials, as are acetone, butanol, ethanol, propanol, ethylene glycol monoethyl ether, and the like.

Solvents may be introduced into the system initially during the initial reaction of a precatalyzed liquid epoxy resin, to increase its molecular weight. For this purpose, a preferred solvent is ethylene glycol monobutyl ether, at 15% by weight based on total reactants. It is also preferred to use a mixture of ethylene glycol monobutyl ether and normal butyl alcohol at about 40/60 by weight ratio, for efficiency in terms of performance for can coatings. Most of the solvent is present to moderate viscosity and some solvent is added to the monomer to moderate reactivity.

The pressure during the grafting reaction ordinarily is atmospheric, but it can be higher or lower. The reaction temperature preferably is maintained in the range from about 80° C. to about 130° C., although the temperature may be adjusted within a relatively wide range to accommodate the reactivity of the mixture. Thus, operating temperatures in the range from about 30° C. to about 200° C. are feasible, depending upon the end results and operating conditions selected.

As noted before, the grafting is done in conjunction with the formation of the addition polymer. The reactants are generally proportioned to leave no more than about 3% oxirane in the reaction mixture, with zero to 1% oxirane content representing a typical level for the production of binders for sanitary coating compositions.

While the use of a solvent is optional, and the reaction may go forward in the absence of solvent, ordinarily the amount of solvent may be in the range from about 5% to 30% by weight of the sum of the other components.

To conclude, conventional solution copolymerization conditions are preferably employed for the grafting reaction. The monomers and free radical initiator can be batch charged to the epoxy resin but metered addition is preferred for exotherm control. The reaction mixture is normally held for up to three hours at reaction temperature, after addition of monomer has been completed, to complete monomer conversion.

THE RESULTING PRODUCT

Under the reaction conditions described, and with at least 3% and preferably 6% to 7% benzoyl peroxide by weight of the monomer mixture, two reaction products are formed at the same time, in association with one another. This is referred to herein as associative formation.

One product, that is present in the final reaction mixture, is a graft polymer. Under the conditions described, grafting takes place at the aliphatic backbone carbons of the epoxy resin that have either one or two hydrogens bonded thereto in the ungrafted state. When the amount of free radical initiator is at about 3% of benzoyl peroxide or equivalent, or below that level, the grafting at the aliphatic backbone carbon atoms is less preferential than when higher amounts are employed. Under all conditions, if an acidic polymerizable monomer is present, some ester-type grafting apparently occurs, but under the operating conditions of the present invention, and particularly under the preferred operating conditions, the amount is very small.

In addition to the graft polymer, the reaction mixture also contains associatively-formed ungrafted addition polymer, formed from the monomer mixture. Unreacted epoxy resin is difficult to detect in the reaction mixture, but up to about 10% by weight of the resin solids present in the reaction mixture may be unreacted epoxy resin, and in some cases, particularly where the epoxy resin constitutes a very high percentage by weight of the total materials reacted, as much as 50% by weight may be unreacted epoxy resin. When the epoxy resin is as little as 5% of the initial reaction mixture, a higher proportion of it may be grafted.

The epoxy resin may have very little grafting on it, but what is there, is important in terms of properties. It is generally preferred that there be sufficient epoxy resin present initially, and sufficient grafting, so that the epoxy resin component of the graft polymer constitutes at least about 5% by weight of the final reaction mixture. In the production of a resin binder blend for a can coating composition, for example, the reaction product mixture is formed from initial reactants made up of 80 parts by weight of a diepoxide resin to about 20 parts by weight of a monomer mixture containing primarily methacrylic acid and styrene, together with a minor amount of ethyl acrylate, in a weight ratio of 65:34:1, respectively, with the reaction taking place in the solvent system in the presence of from about 6% to about 7% benzoyl peroxide by weight of the monomer mixture.

Because of the difficulty of separating the graft polymer from the other components of the reaction mixture, molecular weight measurements on it have been difficult to make and at best are probably only approximations. The indications are that the molecular weight range of the graft polymer is in the range from about 5,000 to about 40,000.

For coating compositions, the grafting between the addition polymer component and the epoxy resin component should take place to the extent of at least 1½ weight parts of the addition polymer component for each 100 weight parts of the epoxy resin component.

There are several items of evidence indicating that the graft polymer that is obtained does have the structure described. One important piece of evidence is that the Acid Number, that would be expected to be obtained from a simple mixture of the components, is close to the Acid Number that is observed in the final reaction product mixture. This indicates that there is little ester formation during grafting. In addition, evidence obtained through the use of Carbon 13 nuclear magnetic resonance spectroscopy tends to confirm the indication that there is little ester formation during grafting, as do chemical reactions with epoxy fragments (model structures).

For coating compositions, the Acid Number of the reaction product mixture should be in the range from about 30 to about 200, preferably 45 to 150, and for sanitary coating compositions, the acid number should be in the range from about 80 to about 90, and preferably, close to about 85.

When benzoyl peroxide is employed at a level greater than 3% by weight of polymerizable monomer, grafting to carbons in the aliphatic backbone chain of the epoxide component is favored, but at the 3% level of benzoyl peroxide, little of such grafting occurs at the aliphatic carbons. When the amount of benzoyl peroxide or equivalent is increased to a preferred operating level of about 6%-7%, optimum results in terms of production of the desired kind of grafting and economy are usually attained.

COATING COMPOSITIONS

To convert reaction mixtures produced in accordance with the present invention to aqueous suspensions, the techniques employed are essentially conventional. The graft polymer is dispersed in deionized water, using a fugitive base (under curing conditions for the coating) such as primary, secondary, and tertiary alkyl, alkanol, and aromatic amines and alkanolalkyl mixed amines; e.g. mono-ethanol amine, dimethyl ethanol amine, diethanol amine, triethyl amine, dimethyl aniline, ammonium hydroxide or the like. Ordinarily this is done by adding an amine with some water and mixing vigorously while (optionally) warming, then diluting the dispersion with more deionized water as is desired.

The amount of water in the final dispersion depends on the viscosity desired, which, in turn, is related to the method of application. For spraying the dispersion, water amounting to about 60% by weight of the dispersion represents a typical level, within a preferred range of composition for the dispersion of from 10% to 30% by weight of solids and from about 70% to 90% of volatiles, that is, base, water, and solvents. The base is usually about from 2% to 6%, water from about 30% to 90%, and the organic solvents from zero to 40%, all percentages being by weight based on the sprayable dispersion. The solids comprise the reaction mixture solids, about 9% to 29%, and cross-linking agent, about 1% to 10%, based on the sprayable dispersion.

As to applications other than spraying, the aqueous dispersion may comprise: 10% to 40% solids, which are proportioned as follows: 0.1% to 16% by weight of a cross-linking agent, and 6% to 39.9% by weight of the graft polymer-containing reaction mixture; and 60% to 90% volatile components, generally divided into organic solvent, 6% to 35%, and water, 25% to 80%. It is preferred that some organic solvent be used to facilitate application, and it is generally used in the ratio of one part by weight of solvent to about three parts by weight of water.

The organic solvent can be made up of one or more of the known solvents such as butanol (normal), 2-butoxy-ethanol-1, xylene, toluene, and other solvents. It is preferred to use n-butanol in combination with 2-butoxy-ethanol-1, in equal amounts.

An aminoplast resin is preferred for cross-linking with the graft polymer. It can be added to the graft polymer before neutralization and diluting, or thereafter. Typical aminoplasts include melamine, benzoquanamine, acetoquanamine, and urea resins such as ureaformaldehyde. Commercially available aminoplasts which are water soluble or water dispersible for the instant purpose include Cymel 301, Cymel 303, Cymel 370, and Cymel 373 (all being products of American Cyanamid, Stamford, Conn., said aminoplasts being melamine based, e.g., hexamethoxy-methyl melamine for Cymel 301), and Beetle 80 (products of American Cyanamid which are methylated or butylated ureas.)

Other suitable aminoplast resins are of the type produced by the reaction of aldehyde and formoguanamine; ammeline; 2-chloro-4,6-diamine-1,3,5-triazine; 2-phenyl-p-oxy-4,6-diamino-1,3,5-triazine; and 2,4,6-triethyl-triamino-1,3,5-triazine. The mono-, di-, or triaryl melamines, such as 2,4,6-triphenyl-triamino-1,3,5-triazine, are preferred. Other aldehydes used to react with the amino compound to form the resinous material are crotonic aldehyde, acrolein, or compounds which generate aldehydes, such as hexamethylene-tetramine, paraldehyde, and the like.

If there is little or no oxirane functionality in the graft polymer, then a cross-linker is necessary; otherwise, it is desirable, but the graft polymer is self cross-linking with heat.

Another way to introduce cross-linking capability into the reaction mixture and the graft polymer is by utilizing as all or part of the polymerizable monomer, in the initial reaction mixture, a material such as acrylamide or an alkyl derivative thereof, or a material such as bis maleimide.

The coating composition of the present invention can be pigmented and/or opacified with known pigments and opacifiers. For many uses, including food uses, the preferred pigment is titanium dioxide. Generally the pigment is used in a pigment-to-binder ratio of 0.1:1 to 1:1, by weight. Thus titanium dioxide pigment can be incorporated into the composition in amounts of from about 5% to 40% by weight, based on solids in the composition.

The resulting aqueous coating composition can be applied satisfactorily by any conventional method known in the coating industry. Thus, spraying, rolling, dipping, flow coating or electrodeposition applications can be used for both clear and pigmented films. Often spraying is preferred. After application onto the metal substrate, the coating is cured thermally at temperatures in the range from about 95° C. to about 235° C. or higher, for periods in the range from 1 to 20 minutes, such time being sufficient to effect complete curing as well as volatilizing of any fugitive component therein. Further, films may be air dried at ambient temperatures for longer periods of time.

For metal sheet substrates intended as beverage containers and particularly for carbonated beverages such as beer, the coating should be applied at a rate in the range from 0.5 to 15 milligrams of polymer coating per square inch of exposed metal surface. To attain the foregoing, the water-dispersible coating as applied can be as thick as 1/10th to 1 mil.

For a better understanding of the present invention, the following examples are provided. In this application, all parts are parts by weight, all percentages are weight percentages, and temperatures are degrees Centigrade unless otherwise expressly noted.

EXAMPLE 1

Preparation of a Coating For a Beverage Can

A plant batch was prepared according to the following procedure: 231 pounds of epoxy resin (DER 333) were heated in an agitated reactor to about 82°; 117 pounds of bisphenol A were added with agitation. The reactor then was heated to about 191° over a period of about 2 hours and held there for an additional 2 hours. Periodic testing for viscosity and percent oxirane were made. Target oxirane value was about 0.6% and viscosity at 25° C. between Z and $Z_1$ (Gardner-Holt). When these values were obtained, 135 pounds of 2-butoxy-ethanol-1 were added, followed by 203 pounds of N-butanol. The molecular weight of the epoxy resin at this point was about 5,500 based on oxirane content.

In a separate vessel there was loaded and mixed the following: 64 pounds of methacrylic acid, 40 pounds of styrene, 44 pounds of ethyl acrylate, and 10 pounds of benzoyl peroxide. This monomer mixture was added gradually to the reactor containing the epoxy resin over a period of 2 at hours uniform rate. The reaction temperature was maintained at 118°. Viscosity was checked periodically on samples. The batch was cooled to 85°; its Acid Number on solids was 85.

The resin batch then was fed into an agitated reducing vessel containing a mixture of 1,095 pounds of deionized water (resistivity at least 50,000 ohm-cm.) and 57 pounds of dimethylethanolamine. The temperature of the resulting blend was 50°. It was held there for about an hour, then the blend was cooled to below 32° by adding 500 pounds of the cool deionized water. The water-dispersed resin had the following properties:

N.V. 20%, dispersion stable: pH 7.8
Viscosity (Ford #4 cup): 22±sec.

This water dispersion then was modified by the blending in of 25 pounds of an aminoplast resin (Cymel 370, American Cyanamid Company). The dispersion remained stable.

Cans coated with the sanitary coating of the present example exhibited excellent properties and were suitable for the carbonated beverage and beer industries. Coated cans were particularly notable for their inertness. They did not impart any undesirable organoleptic property or haze to the canned beverage.

EXAMPLES 2–20

The Effect of Variations in Composition

In Example 1, the amount of benzoyl peroxide employed during the reaction was about 6.8% by weight based upon the monomer mixture. To demonstrate the effect of changes in composition, with respect to proportions of the epoxy resin and the several monomers in the monomer mixture, several additional demonstrations were made. In each case, the amount of benzoyl peroxide employed was held at the level of about 6.8% based upon the weight of the monomers in the monomer mixture, and the order of addition of the reactants, reaction temperature and pressure, and other operating parameters were similar to those in Example 1. Thus, the grafting and addition operation was carried on at 120° C. The solvents utilized were n-butanol and 2-butoxy-ethanol-1, in equal amounts.

The amounts of the reactants employed in these additional demonstrations, the characteristics of the epoxy resin reactant, and the acid number and oxirane content of the final reaction mixture are reported in Table III below. The actual measurements of Acid Numbers and oxirane contents were made on 60% solutions of nonvolatile matter (N.V.=60).

Table III

ACIDIC RESINS COMPOSITIONS

| | | | | % by Weight | | | | | Final Resin | |
|---|---|---|---|---|---|---|---|---|---|---|
| Ex. | Vis.(1) | % Oxirane(2) | M.W.(3) | Ep.(4) | MAA(5) | Sty.(6) | EA(7) | MMA(8) | A.N.(9) | % Oxirane(10) |
| II | L | 1.7 | 1,883 | 70 | 13 | 11 | 6 | 0 | 85 | 0.94 |
| III. | U | 0.9 | 3,555 | 70 | 13 | 8 | 9 | 0 | 85 | 0.55 |
| IV. | Z-Z$_1$ | 0.6 | 5,335 | 30 | 13 | 34 | 23 | 0 | 85 | 0.12 |
| V. | Z-Z$_1$ | 0.6 | 5,335 | 50 | 13 | 22 | 15 | 0 | 85 | 0.30 |
| VI. | Z-Z$_1$ | 0.6 | 5,335 | 70 | 13 | 8 | 9 | 0 | 85 | 0.40 |
| VII. | Z-Z$_1$ | 0.6 | 5,335 | 70 | 13 | 7.7 | 0.3 | 9 | 85 | 0.35 |
| VIII. | Z-Z$_1$ | 0.6 | 5,335 | 80 | 13 | 6.8 | 0.2 | 0 | 85 | 0.32 |
| IX. | Z-Z$_1$ | 0.6 | 5,335 | 70 | 13 | 4 | 0.3 | 12.7 | 85 | 0.36 |
| X. | Z-Z$_1$ | 0.6 | 5,335 | 80 | 7 | 12.8 | 0.2 | 0 | 45 | 0.35 |
| XI. | Z-Z$_1$ | 0.6 | 5,335 | 80 | 13 | 6.8 | 0.2 | 0 | 85 | 0.35 |
| XII. | Z$_2$ | 0.35 | 9,143 | 80 | 13 | 6.8 | 0.2 | 0 | 85 | 0.18 |
| XIII. | Z$_5$ | 0.2 | 16,000 | 80 | 13 | 6.8 | 0.2 | 0 | 85 | 0.12 |
| XIV | Z$_1$ | 0.60 | 5335 | 50 | 9.36 | 40.14 | 0.50 | 0 | 60 | None |
| XV | Y | 0.62 | 5161 | 75 | 15.75 | 8.24 | 1.01 | 0 | 100 | .21 |
| XVI | Y-Z | 0.59 | 5424 | 70 | 19.51 | 10.19 | 0.30 | 0 | 127 | .27 |
| XVII | Y | 0.62 | 5161 | 60 | 25.75 | 13.85 | 0.40 | 0 | 168 | .22 |
| XVIII | Z | 0.66 | 4848 | 50 | 32.50 | 17.00 | 0.50 | 0 | 210 | .23 |
| XIX | X-Y | 0.75 | 4267 | 50 | 13.20 | 35.80 | 0.50 | 0.5 | 86 | .22 |
| XX | — | 1.04 | 3076 | 70 | 13.00 | 4.00 | 0.30 | 12.7 | 60 | .33 |

(1)Viscosity of epoxy resin at 40% nonvolatiles in 2-butoxy-ethanol-1.
(2)% Oxirane of epoxy resin, on nonvolatiles.
(3)Molecular weight of epoxy resin, calculated from oxirane content.
(4)Ep. = Epoxy Resin
(5)MAA = Methacrylic Acid
(6)Sty. = Styrene
(7)EA = Ethyl Acrylate
(8)MAA = Methyl Methacrylate
(9)A.N. = Acid Number (on nonvolatiles)
(10)% Oxirane (on nonvolatiles)

Each resinous reaction product listed in Table III for Examples II through XIII inclusive was diluted with deionized water to 20% solids utilizing dimethyl ethanolamine as the neutralizing or ionizing agent. Samples of these water dispersions were kept on the shelf at room temerature and at 120° F. for periods of time exceeding 8 months. No gelation or precipitation was observed in any sample. Only slight changes in both pH and viscosity were detected. The remaining examples exhibit similar properties.

Each of these water-dispersed resins was sprayed onto tin plate metal substrates, and cured, and properties such as blister resistance, coverage, foaming resistance, electrical conduction, adhesion, and film continuity were evaluated and in each case were found to be satisfactory. A brief description of these tests appears later in this specification, under the heading, "General Comments".

Table IV reports the respective intitial viscosities (#4 Ford Cup/seconds at 25° C.) and pH of the resinous reaction products of Examples 2-13 of Table III. Both properties are reported as measured on aqueous dispersions of the respective samples. Table IV reports also the percentages of neutralization (ionization) with dimethyl ethanolamine for each example, and the viscosity and pH of the dispersions, measured in the same manner as previously, but after these products had been stored for eight months at about 49° C.

TABLE IV

HYDROLYTIC STABILITY VISCOSITY AND pH VALUES (20% solids)

| Example | Initial* Viscosity (sec.) | Initial pH | % Neutral-ization | Viscosity (sec.)* after 8 mos. at 49° C. | pH after 8 mos. at 49° C. |
|---|---|---|---|---|---|
| II. | 26 | 8.35 | 85 | 22 | 8.28 |
| III. | 25 | 7.8 | 85 | 23 | 7.75 |
| IV. | 16 | 8.3 | 85 | 16 | 8.3 |
| V. | 33 | 8.45 | 85 | 27 | 8.4 |
| VI. | 21 | 7.9 | 85 | 19 | 7.9 |
| VII. | 23 | 7.6 | 85 | 23 | 7.5 |
| VIII. | 33 | 7.8 | 85 | 28 | 7.76 |
| IX. | 30 | 7.6 | 75 | 25 | 7.6 |
| X | 21 | 8.55 | 90 | 17 | 8.45 |
| XI | 30 | 7.9 | 70 | 26 | 7.9 |
| XII. | 32 | 7.9 | 70 | 30 | 7.85 |
| XIII. | 36 | 7.85 | 70 | 32 | 7.8 |

*#4 Ford Cup

ADDITIONAL EXAMPLES

Resinous reaction products, prepared in accordance with the present invention are readily stored, transported, formulated, and applied in a liquid vehicle, either in a solvent vehicle, or in an aqueous dispersion. In either case, the reaction product may easily be extended, usually for the sake of economy, but also to achieve desired characteristics, by blending in either an added amount of an epoxy resin, preferably that used as an initial reactant, or an added amount of addition polymer, preferably similar to that produced during the reaction as ungrafted addition polymer, or both.

The following examples illustrate extension of the reaction mixture with added epoxy resins, at different molecular weights.

EXAMPLE XXI

Use of a Solid Epoxy Resin Extender, MW 6,500

1150 grams of Epon 829 epoxy resin were placed in a reactor, to which was added 606 grams of bisphenol A and 310 grams of 2-butoxy-ethanol-1. Epon 829 epoxy resin is a liquid resin that has a Gardner color of 3 max., a density at 68° F. of 9.6 lbs/gal., and an epoxide equivalent of 193–203, as reported by its manufacturer, Shell Chemical Company. The calculated average molecular weight is about 396. The material was heated to about 82° C. before the bisphenol A was added, then it heated further to 145° C. It was allowed to go up to 175° C., at which temperature the viscosity was U-V. Then 170 grams of 2-butoxy-ethanol-1 were added, and the temperature was raised to 180° C., and was held there for about two hours. Then 826 grams of N-butyl alcohol was added.

In a separate vessel, 283 grams of methacrylic acid, 148 grams of styrene, 4 grams of ethyl acrylate, and 30 grams of benzoyl peroxide (about 6.9% based on monomers) were mixed. In 111 grams of 2-butoxy-ethanol-1, this monomer mixture was added to the reactor containing the epoxy resin over a period of two hours at about 115° C. After two hours, with the temperature at 117° C., 62 grams of N-butyl alcohol was added, and the whole was mixed at 117° C. for two hours. Then 339 grams of Epon 1009 was added and mixed in with the other ingredients until dissolved. Epon 1009 epoxy resin is a solid resin that has a Gardner-Holdt viscosity of $Z_2$–$Z_5$, a Gardner color of 5 max., and an epoxide equivalent of 2500–4000, according to its manufacturer, Shell Chemical Company. The calculated average molecular weight is about 6,500. The temperature of the reaction mixture was then 116°.

The entire resinous mixture was diluted with water to 25% nonvolatiles. After the addition of a neutralizing agent, the emulsion had the following properties:
Nonvolatiles: 26.07%
Viscosity-#4 Ford Cup: 23 seconds
pH: 6.90
% Neutralized: 50
Acid Number (on nonvolatiles): 74.20

The above-described water-reducible composition was sprayed on both tin plate and aluminum substrates of the kind used for making two-piece cans for carbonated beverages, and the coatings were cured by baking. The resulting cured coatings had excellent properties in terms of flavor inertness, absence of blistering, and adhesion.

EXAMPLE XXII

Use of a Solid Epoxy Resin Extender, MW 1,850

The same procedure as in Examples XXI was followed to make a reaction mixture containing a graft polymer. The reaction mixture was then diluted with 339 grams of DER 664 epoxy resin instead of the Epon 1009. According to the manufacturer, Dow Chemical Company, DER 664 epoxy resin is a solid resin having an epoxide equivalent of 875–975, a softening point of 95° C. to 105° C. as measured by "Durrans' Mercury Method", a Gardner-Holdt viscosity of R-V as measured in 40% by weight glycol ether solvent, and a weight of 9.54 lbs. per gallon. The calculated average molecular weight is 1,850.

When this epoxy-extended reaction mixture was neutralized and dispersed in water, the water-reducible composition had excellent application properties and formed excellent cured coatings.

The physical properties of the water emulsion were:
Nonvolatiles: 26.27%
Viscosity-#4 Ford Cup: 20 seconds
pH: 6.90
% Neutralized: 50
Acid Number: 74.60

EXAMPLE XXIII

Use of a Relatively Low Molecular Weight Epoxy Resin Extender

The reaction mixture of Ex. XXI, containing graft polymer, was diluted with 339 grams of DER 661 epoxy resin. According to its manufacturer, Dow Chemical Company, DER 661 epoxy resin is a solid resin having an epoxide equivalent of 475 to 575, a softening point of 70° C. to 80° C. as measured by "Durrans' Mercury Method", a Gardner-Holdt viscosity of G-J as measured in 40% by weight glycol ether solvent, and a weight of 9.65 lbs/gal. The calculated average molecular weight was 1,050.

When the epoxy-extended reaction mixture was neutralized and dispersed in water, the water-reducible composition had excellent properties for application and in the form of cured coatings. The physical properties of the emulsion were:
Nonvolatiles: 26.14%
Viscosity-#4 Ford Cup: 29 seconds
pH: 6.90
% Neutralized: 50
Acid Number: 75.20

The emulsions of Examples XXI through XXIIII were tested for dispersion stability over an extended period of time at 120° F. Each exhibited excellent properties with substantially no detectable phase separation and no changes in viscosity or pH.

EXAMPLE XXIV

Investigation of the Grafting Mechanism

A polymeric blend is prepared by reacting an epoxy resin with an addition polymerizable monomer mixture in an 80 to 20 weight ratio, in the following manner.

First, a DER 333 liquid epoxy resin is reacted with bisphenol A in the proportion of about 65% of the resin to about 35% by weight of bisphenol A. In a separate vessel a mixture is made of methacrylic acid, styrene, and ethyl acrylate, in the weight ratio of 65 to 34 to 1, respectively. About 6.8% of benzoyl peroxide is added by weight of the mixture, and the mixture is then gradually added to the epoxy resin at a reaction temperature of about 120° C. during a two hour period. After an additional holding period of about two hours at the same elevated temperature, samples of the product are taken for structural evaluation.

Carbon 13 nuclear magnetic resonance spectroscopy indicates that most of the grafting between the addition copolymer and the epoxy resin is restricted to what had been, before the grafting, aliphatic secondary (and possibly aliphatic tertiary) backbone carbon atoms of the epoxy resin backbone.

In order to delineate further such grafting, several different model compounds, each having an aliphatic carbon atom arrangement like some of those present in the epoxy resin, are reacted separately with the same mixture of monomers under conditions comparable to the grafting conditions described above. Carbon 13 nuclear magnetic resonance spectroscopy on these resulting analog products indicates that grafting on aliphatic backbone carbon atoms of the model compounds occurs practically entirely on those carbons which had been aliphatic secondary carbons. This suggests a fair likelihood of the same situation prevailing in the instant resinous blend reaction product. A small decrease is noted in the Acid Number of the reaction product, relative to the Acid Number calculated for the equivalent mass but based upon all of the methacrylic acid charged to the reactor, and this small decrease in Acid Numbers tends to corroborate the findings made through Carbon 13 spectroscopy.

Hence, it is concluded that while other grafting to aliphatic carbon atoms of the epoxy resin backbone may occur, the proportion is minor relative to the grafting on aliphatic backbone carbons that have either one or two hydrogens in the ungrafted state.

EXAMPLE XXV

Effect of Using Different Amounts of Benzoyl Peroxide

A series of resinous blends are prepared in essentially the same manner as described in Example XXIV, but with each addition polymerization operation using a different percentage of benzoyl peroxide free radical initiator based on the weight of the mixed monomers.

The blends are observed for their ease of dispersibility in aqueous amine solution, and the resulting aqueous dispersions are observed for their resistance to precipitation (stability) for a week. The following observations for this work are typical.

TABLE V

| Wt. % Benzoyl Peroxide based on mixed monomers | Remarks |
| --- | --- |
| 3 | marginally dispersible, tending to separate in about a day[1] |
| 5 | very stable aqueous alkaline dispersion made readily |
| 7 | very stable aqueous alkaline dispersion made readily |
| 9 | very stable aqueous alkaline dispersion made readily |
| 15 | very stable aqueous alkaline dispersion made readily[2] |

[1]Would be considered borderline at best for sanitary coating use and most likely would require considerable extra hydrophilic organic solvent for ease of aqueous dispersion.
[2]The high proportion of free radical initiator not only gives rise to concerns about high costs, but also concerns about the possibililty of free radical initiator fragments (e.g. benzoic acid) giving rise to undesirable organoleptic and other properties, e.g. tending to produce components extractable into beverages, various low mol weight substances, etc.

GEMERAL COMMENTS

To sum up, this invention provides associatively-formed resinous blends of epoxy resin, addition polymer, and grafts of addition polymer onto the epoxy resin structure wherein such grafting is restricted mainly to what were, before such grafting, aliphatic secondary carbon atoms of the epoxy resin aliphatic carbon backbone, i.e., the non-oxirane part of the molecule. Most likely such grafting is restricted mainly to former aliphatic secondary (methylene) carbon atoms. At any rate, this grafting provides an especially durable linkage for modifying enough epoxy resin present to exert a profound influence on the properties of the resinous blend product as well as to impart lasting characteristics of the grafted-on addition polymer to the epoxy resin receptor. Thus, for example, such graft polymer that is rich in carboxyl groups imparts to the resinous blend product superior characteristics for making water-reduced sanitary coatings used inside cans for beverages and the like, provided that there are a few parts by weight of grafted carboxylic acid-containing addition polymer supplying at least about one weight part of carboxyl groups per 100 parts of starting epoxy resin. Such a blend is highly resistant to undesirable reaction in and precipitation from mildly alkaline aqueous dispersion. However, to obtain even so modest a proportion of this durable grafting and attendant influence upon properties of the associatively- formed blend, it is essential to commence the addition polymerization with an unusually large amount of free radical initiation with respect to the polymerizing temperature and amount of polymerizable monomer being used, e.g., from 4% to 7% or more by weight of benzoyl peroxide based on weight of such monomer when reacting at a temperature about 115° C.

In its preferred embodiments, then, this invention is primarily concerned with the production of resinous compositions that are intended for use in coating cans for items for human consumption, and particularly, for soft drinks and beer. There are several tests that are applied in order to determine whether a particular coating composition is satisfactory for these surprisingly demanding end uses. Some of the more important tests are described briefly below. Whenever a coating composition has been indicated in this application to be acceptable for use as a sanitary coating composition, it can pass many of these tests.

The Flavor Test. The cured coating in the can should impart no discernable flavor to the contents of the can, nor should it alter the flavor of the can contents in any way. This test is particularly important with respect to beer can coatings.

Adhesion. The adhesion test is conducted at room temperature under ambient humidity conditions. The coated panel to be tested is cross-hatched by cutting three parallel lines, each approximately 1" long, about 1/8" apart. These lines are intersected at 90° with three identical lines similarly spaced. Usually a knife edge or razor blade is used to cut the lines. A strip of Scotch cellophane tape is then firmly pressed diagonally across the scribed squares. The tape is pulled off with a quick continuous pull, using a peeling-back motion at an angle of pull of about 150°. The cross-hatched area of the panel is then inspected for removal of coating. If any coating is removed, the percentage of removal is recorded as a numerical rating in the range of zero to 10. A zero rating indicates a perfect score, with no removal, and a 10 rating indicates 100% removal.

Storage Stability. Water reducible coatings must demonstrate acceptable hydrolytic stability on extended storage. This is determined by making an initial measurement of all of the properties of the coating composition and then redetermining them after a period of storage, on samples stored not only at room temperature but also at 50° C. Some of the most significant parameters, with respect to stability, are freedom from gelation, freedom from precipitation, and freedom from changes in pH. To be acceptable as a sanitary coating composition, there should be little discernible change in viscosity after room temperature storage for 12 months or after storage at 50° C. for 8 months, indicating the absence of gelation.

Thermal Stability. In some can manufacturing processes, after the coating has been applied, the coated metal is dipped in a solder bath at a temperature in the range from about 340° C. to 370° C. for a period up to about 5 seconds. The amount of discoloration of the coating is an indication of the extent of decomposition. In other can fabricating operations, where use is made of ends that are die-stamped, the assembled cans are usually immersed in a bath of acidic cooper sulfate for 5 minutes,, to test for any cracking in the coating during the fabrication. The presence of a crack will be indicated by the deposition of a small amount of copper on the metal of the can.

Water Pasteurization Test. This test is often performed on cured coatings that have been sprayed and baked on the interiors of two-piece aluminum cans for beverages. The test is also used to measure the resistance of a coating material to water and to water vapor at pasteurization temperature. For test purposes, the coating weight is from 12 to 16 milligrams per 4 square inches of panel. After the coating has been applied and cured by baking for about 2 minutes at about 218° C. (390° F.), two test strips are cut from the coated panel, each approximately $1\frac{1}{2}"\times 9"$. The top 2" of each test strip is bent back upon itself, with the coated side exposed. Each test strip is then half-immersed in a water bath at about 94° C. (170° F.) by hanging each strip over the edge of the water bath. After immersion for $\frac{1}{2}$ hour, the strips are cooled under running tap water at room temperature, dried, and examined immediately for blush and for adhesion.

Any blush (whitening) indicates the absorption of water during pasteurization and is rated on a scale from zero to 10, zero being perfect and indicating no blush, and 10 indicating complete whitening. Both the immersed area and the area exposed only to water vapor are rated. A blush rating range of zero to 2 is acceptable.

The adhesion test, as described above, is applied to both the immersed area and the water vapor exposed area, and is rated accordingly, again on a scale of zero to 10. Coating removal from a test strip in the range from zero to 1 is acceptable.

Enamel Rater Test. This is a test employed by canners, to evaluate metal exposure in coated cans. Under the conditions of the test, a low voltage is applied between an electrode that is immersed in an electrolyte-filled can, and the can body. When the coating on the can is imperfect, metal is exposed and current flows. The flow of current is indicated on a meter, and the magnitude of the current is related to the total area of metal that is exposed to the electrolyte. Thus, the size of the current flow, as indicated by the reading on the milliammeter, provides a relative measure of the total metal exposure. Generally each canner has his own specification as to the permissible current flow.

The conditions of the test involve the use of a standardized electrolyte, and a coating weight of 2.5 mgs. per square inch. For a 12-ounce beverage can, this coating weight is approximately 110 to 120 mgs. per can. Under the usual test conditions, a current flow rate below 25 milliampers is acceptable for aluminum beer cans, for many brewers.

The requirements for soft drink cans are more stringent and the normal requirement for aluminum soft drink cans in production is a current flow rate of less than 5 milliamperes. Accordingly, higher coating weights are normally applied to coatings for soft drink cans, normally about 4.5 mgs./in.$^2$, which amounts to about 160 to 200 mgs. for a 12-ounce soft drink can.

The following characteristics are also often evaluated for sprayable coating compositions for two-piece cans.

Wetting. The composition on the coated surface must have the ability to form a continuous wet film. This is a particularly critical requirement with respect to the lower wall area of two-piece cans because this is where the can is farthest from the spray gun.

Blister Resistance. Some applications, such as single coats for two-piece tin plated cans, require high coating weights. Normally the highest wet film concentration will occur in the moat area. Because of the great thickness of the film in this area, there is a tendency to blister, which is a disruption of the film surface by volatilization of liquid.

Foaming. When applied by an airless spray by 1,000 psi, the coating must not foam on the can. When foaming occurs, it causes film discontinuity and a rough surface.

Water dispersion sanitary coating compositions made in accordance with embodiments of this invention can pass many of the tests mentioned above. Such compositions perform exceptionally well when sprayed by both air and airless devices. Excellent atomization can be obtained regardless of the type of nozzle or pressure, that is, excellent spraying applications can be obtained at pressures in the range from 2 psi up to 1500 psi.

Coating materials made in accordance with the invention have been applied to tin plate, aluminum, to metal coated with primers, to plastics made from ABS, polyolefins, polyesters, polyamides, and the like, in a range of application thicknesses producing cured weights per 12-ounce can in the range from 1 to 10 mgs/in, which is 50 to 300 mgs. per 12-ounce can. Film continuity generally has been excellent throughout this range.

Moreover, these compositions have excellent application properties and generally their use is free from problems with respect to blistering, sagging, solvent washing, foaming, and excess flow.

While the specific examples demonstrate, generally, preferred embodiments of the invention, other preferred embodiments and practices also lead to excellent coating compositions. Thus, if the procedure of Ex. XXI is followed, and an added diluent is added (in addition to the epoxy resin diluent), made by the addition copolymerization of the same monomer mixture as used in that example, quite satisfactory coatings can be obtained, generally at lower cost, up to addition levels of yielding an ungrafted total about 40% of addition polymer based on the mixture, and even more may be tolerated. Similar results are obtained when the only diluent used is the addition polymer, i.e., there is no addition to the reaction mixture of ungrafted epoxy resin.

While the compositions described generally have been those using liquid vehicles, the binders may be prepared in the absence of solvents, cooled, and pulverized to form powdered products. These powders can be dissolved in solvent vehicles, and can be dispersed in aqueous vehicles if some amine is added at the time of use.

The amount of free radical initiator, benzoyl peroxide, has been expressed in terms of the polymerizable monomer. Based on the entire reaction mixture, it is preferred that the amount be in the range from not below 0.6% to not above 5%.

CONCLUSION

While the invention has been disclosed by reference to the details of preferred embodiments thereof, it is to be understood that such disclosure is intended in an illustrative, rather than in a limiting sense, and it is contemplated that various modifications in the compositions and processing techniques, in particular, will readily occur to those skilled in the art, within the spirit of the invention and scope of the appended claims.

What is claimed is:

1. An associatively-formed resinous blend that is dispersible in a basic aqueous vehicle, and that has an oxirane content of no more than 3%, comprising:
   (a) carboxylic acid-functional graft polymer,
   (b) ungrafted carboxylic acid-functional addition polymer, and
   (c) ungrafted aliphatic or aromatic 1,2-epoxy diepoxide resin;

said graft polymer being a 1,2-epoxy diepoxide resin component onto which is grafted an addition polymer component, said graft polymer and said ungrafted addition polymer containing carboxylic acids units furnishing carboxyl groups that contribute at least 5% of the weight of said blend, said graft polymer being formed by the reaction of a 1,2-epoxy diepoxide resin and ethylenically unsaturated monomer in the presence of at least 3% of benzoyl peroxide by weight based on monomer, or under equivalent free radical initiating conditions for the reaction including the use of a peroxide initiator, at a temperature in the range from about 80° C. to 200° C., the grafting between said addition polymer component and said epoxy resin component being at aliphatic backbone carbon atoms of said epoxy resin component, to the extent of at least 1½ weight parts of said addition polymer component per 100 weight parts of said epoxy resin equivalent in the blend, the epoxy resin component of said graft polymer having an initial molecular weight of from about 350 to about 20,000 and with said ungrafted epoxy resin constituting from about 5 to 90% of said blend by weight, the acid-functionality of the reaction product composition being sufficiently high to establish the blend as a dispersion in an aqueous medium containing a base that ionizes the acid-functional polymers.

2. A water-reducible coating composition comprising the resinous blend of claim 1 dispersed in an aqueous vehicle with a basic ionizing agent that ionizes said acid-functional graft polymer and said acid-functional addition polymer, the ionization of the acid-functional polymers being sufficient to establish a dispersion of the blend in the aqueous vehicle.

3. The coating composition of claim 2 that includes in the dispersed phase a supplemental quantity of addition polymer from an extraneous source dispersed in the aqueous vehicle, the ionization of the acid-functional polymers being sufficient to establish a dispersion of all of the polymer solids in the aqueous vehicle.

4. The coating composition of claim 2 wherein said epoxy resin component has an initial molecular weight in the range from about 4,000 to about 10,000 and an oxirane content not substantially above 8%, said epoxy resin component and said ungrafted epoxy resin together providing from 60 to 90% by weight of said blend.

5. The coating composition of claim 4 which includes a supplemental quantity of addition polymer from an extraneous source dispersed in the aqueous vehicle, the ionization of the acid-functional polymers being sufficient to establish and to maintain a dispersion of the solids in the aqueous vehicle.

6. The coating composition of claim 2 or a concentrate thereof wherein the Acid Number (N.V.) of the blend is from about 30 to about 200, and the concentration of said blend in the coating composition is from about 9% to about 29% by weight of the composition.

7. The coating composition of claim 6 wherein both said addition polymer and said addition polymer component contain copolymerized units of an acrylic acid, styrene, and a lower alkyl ester of an acrylic acid, and wherein the total weight of these respective monomer units in said blend relative to the total weight of said epoxy resin and epoxy resin component therein is from about 30 to about 70, to about 10 to about 90.

8. A polymeric blend that is dispersible in a basic aqueous vehicle, and that has an oxirane content of no more than 3%, that is the reaction product of:
   (a) from about 10 to about 90% by weight of said blend of an aromatic 1,2-epoxy resin consisting of a glycidyl ether of polynuclear polyhydric phenol that has an average molecular weight of from about 350 to about 20,000 and aliphatic backbone carbon chains,
   (b) from about 10% to about 90% by weight of said blend of addition polymerizable monomer containing ethylenic unsaturation and comprising an acrylic acid, reacted in the presence of at least 3% by weight of benzoyl peroxide by weight based on said monomer, at a temperature in the range from about 110° C. to about 130°, or under equivalent free radical initiating conditions for the reaction using a peroxide initiator, to effect the simultaneous addition polymerization of the monomer through its ethylenic unsaturation and to produce an acid-functional reaction product composition that comprises a graft polymer of addition polymer grafted on the epoxy resin to the extent of at least about 1½ weight parts of said addition polymer component per 100 weight parts of said epoxy resin equivalent in the blend, the graft polymer being characterized by the substantial absence of hydrolyzable functional groups other than terminal epoxy groups, the acid-functionality of the reaction product composition being sufficiently high to establish the reaction product as a dispersion in an aqueous medium containing a base that ionizes the acid-functional polymers.

9. A coating composition comprising the acid-functional resinous composition of claim 8 dispersed in an aqueous vehicle with a basic ionizing agent that ionizes said acid-functional resinous product composition, the ionization being sufficient to establish a dispersion of the blend in the aqueous vehicle.

10. The coating composition of claim 9 wherein the initial epoxy resin has a molecular weight in the range from about 4,000 to about 10,000 and supplies from 60% to 90% of the solids of the polymeric blend by weight, and the initiator employed in the reaction is at least 4% benzoyl peroxide based on the weight of monomer.

11. The coating composition of claim 10 wherein the addition polymerizable monomer comprises a mixture of an acrylic acid and styrene.

12. A coating composition in accordance with claim 11 wherein the polymer blend is the reaction product of:

(a) from about 60% to about 90% by weight of the blend of said epoxy resin, and (b) from about 10% to about 40% by weight of said blend of the addition polymerizable monomer.

13. A coating composition in accordance with claim 12 wherein the initial epoxy resin furnishes 70% to 80% by weight of the solids of the blend.

14. A coating composition in accordance with claim 12 wherein the resinous blend is an associatively-formed resinous blend that is the reaction product of said epoxy resin and said monomer mixture in the presence of at least 6% of benzoyl peroxide initiator by weight of the monomer, the reaction product including graft polymer, ungrafted addition polymer, and ungrafted epoxy resin, both the graft polymer and the addition polymer being carboxylic acid-functional.

15. A coating composition in accordance with claim 9 in which the polymeric blend is produced by a reaction at a temperature in the range from about 110° C. to about 130° C., the graft polymer product being characterized by the substantial absence of hydrolyzable functional groups other than terminal epoxy groups, said blend comprising:

(a) aromatic 1,2-epoxy diepoxide resin onto which is grafted addition polymer to make an acid-functional graft polymer, (b) ungrafted acid-functional addition polymer, and (c) ungrafted epoxy resin; said blend containing polymerized carboxylic acid monomer units furnishing carboxyl groups equivalent to at least about 5% by weight of the blend.

16. A coating composition in accordance with claim 15 wherein the addition polymer is a copolymer formed predominantly of copolymerized units of methacrylic acid and styrene.

17. A coating composition in accordance with claim 15 wherein the epoxy resin equivalent in the blend is derived from an epoxy resin having a molecular weight of at least 4,000, that furnishes from 50% to 90% by weight of the solids of said blend and wherein the Acid Number of the blend is from 45 to 150.

18. A coating composition in accordance with claim 17, formed by reacting together an initial reaction mixture of at least 60% by weight of the aromatic 1,2-epoxy diepoxide resin, the balance of the reaction mixture being said addition polymerizable monomer mixture, in the presence of at least 4% by weight of the monomer mixture of benzoyl peroxide, said epoxy resin being derived from an epichlorohydrin-bisphenol A reaction product having an oxirane content not above about 8%, said addition polymerizable monomer mixture comprising an acrylic acid and a styrenic monomer wherein the acrylic acid and styrene are in the proportions to each other of from about 4 to 1 to about 1.5 to 1, the Acid Number of said blend being in the range from about 80 to about 90.

19. A coating composition in accordance with claim 18 wherein the blend is formed from a reaction wherein the amount of benzoyl peroxide is 6% or more.

20. A coating composition in accordance with claim 19 wherein the epoxy resin equivalent amounts to about 80% by weight of the total polymer solids present in the blend, the balance of the blend being derived from the addition monomer, and wherein the weight ratio of the acrylic acid acid to the styrenic monomer in the addition copolymer component is about 70 to about 30.

21. A polymeric blend that is dispersible in a basic aqueous vehicle and that has an oxirane oxygen content of no more than 3%, that is the reaction product of:

(a) from about 60 parts to about 90 parts by weight of an aromatic 1,2-epoxy diepoxide resin consisting of a diglycidyl ether of a polynuclear polyhydric phenol, that has a molecular weight in the range from about 4,000 to about 10,000 and that has aliphatic backbone carbon chains, and (b) from about 10 to about 40 parts by weight of a mixture of addition polymerizable monomers comprising a major amount of an acrylic acid and a minor amount of styrene, the quantity of the acrylic acid being sufficient to impart to the blend an Acid Number of from 80 to 90; the addition polymerization of said monomer mixture being conducted in the presence of said epoxy resin and in the presence of benzoyl peroxide at from about 110° C. to about 130° C., in an amount of at least 3% by weight based on the weight of the monomer, or under equivalent free radical initiating conditions for the reaction using a peroxide initiator, simultaneously to effect the addition polymerization of the monomer through its ethylenic unsaturation and to produce an acid-functional reaction product composition that comprises a graft polymer of addition copolymer on the epoxy resin that is characterized by the substantial absence of hydrolyzable functional groups other than terminal epoxy groups, the addition copolymer being grafted onto aliphatic backbone carbon atoms of the initial epoxy resin that have either one or two hydrogens bonded thereto in the ungrafted state, to the extent of at least about 1½ weight parts of said addition polymer component per 100 weight parts of said epoxy resin equivalent in the blend, said reaction product also including associatively-formed, ungrafted addition copolymer in addition to ungrafted initial epoxy resin, said graft polymer and said ungrafted addition copolymer being acid-functional, the acid-functionality of the reaction product composition being sufficiently high to establish and to maintain the product composition as a dispersion in an aqueous medium containing a base that ionizes the acid-functional polymers.

22. A polymeric blend in accordance with claim 21 wherein the epoxy resin furnishes about 80% of the solids of the blend by weight, the mixture of addition polymerizable monomers furnishes about 20% of the solids of the blend by weight, the Acid Number of the reaction product, solids basis, is about 85, and the acrylic acid is methacrylic acid.

23. A polymeric blend in accordance with claim 21, the addition copolymerization of said monomers being conducted in the presence of about 6.8% of benzoyl peroxide by weight of the monomer mixture, said blend being mixed with an organic solvent system.

24. A coating composition comprising a water-reducible aqueous dispersion of the polymeric blend of claim 21 in an aqueous vehicle that contains a base that is fugitive under curing conditions for the coating, the base being present in sufficient quantity to ionize the acid-functional resinous reaction product sufficiently to establish and to maintain a stable dispersion of the blend in the aqueous vehicle.

25. A coating composition in accordance with claim 24 wherein the dispersion includes an added quantity of an epoxy resin from an extraneous source, or an added quantity of addition polymer from an extraneous source, or both, which added quantities are dispersed in the aqueous vehicle, the ionization of the acid-functional polymers being sufficient to establish the solids as a dispersion in the aqueous vehicle.

26. A coating composition comprising a dispersion in an aqueous vehicle which comprises a major amount of water and a minor amount of water-miscible organic solvent material of a blend of film-forming polymeric constituents, together with a base that is fugitive under curing conditions for the coating, wherein the polymeric blend is an associatively-formed mixture having an oxirane oxygen content of no more than 3% of:
(a) carboxylic acid-functional graft polymer,
(b) carboxylic acid-functional addition copolymer, and
(c) ungrafted aromatic 1,2-epoxy diepoxide resin consisting of a glycidyl ether of a polynuclear polyhydric phenol;
said graft polymer being an aromatic 1,2-epoxy diepoxide resin component in its ungrafted state consisting of a glycidyl ether of a polynuclear polyhydric phenol, having a molecular weight of from about 350 to about 20,000 and having aliphatic backbone carbon chains onto which is grafted at aliphatic backbone carbons thereof carboxylic acid-functional addition copolymer comprising addition copolymerized units of an acrylic acid and of a styrenic monomer, to the extent of at least about 2½ weight parts of said addition polymer component per 100 weight parts of said epoxy resin equivalent in the blend, which acid furnishes carboxyl groups that consitute at least 5% by weight of said blend, said graft polymer being formed by the reaction of a 1,2-epoxy diepoxide resin and ethylenically unsaturated monomer in the presence of at least 3% of benzoyl peroxide by weight based on monomer, or under equivalent free radical initiating conditions for the reaction including the use of a peroxide initiator, at a temperature in the range from about 80° C. to 200° C.,
the epoxy resin component of said graft polymer and the ungrafted epoxy resin together constituting at least about 10 and up to 90% by weight of said blend by weight,
the Acid Number of said blend being in the range from about 45 to about 150,
the acid functional polymers being ionized by said base, the ionization of the acid-functional polymers being sufficient to establish and to maintain the dispersion of the blend in the aqueous vehicle.

27. A coating composition in accordance with claim 26 that includes an added quantity of addition copolymer from an extraneous source, the ionization of the acid-functional polymers being sufficient to establish and to maintain all of the resin solids of the blend dispersed in the aqueous vehicle.

28. A coating composition comprising a dispersion in an aqueous vehicle which comprises a major amount of water and a minor amount of water-miscible organic solvent material of a blend of film-forming polymeric constituents together with a base that is fugitive under curing conditions for the coating, wherein the polymeric blend is an associatively-formed mixture formed by reacting together an initial reaction mixture of from 50% to 90% by weight of an aromatic 1,2-epoxy diepoxide resin consisting of a glycidyl ether of a polynuclear polyhydric phenol that has aliphatic backbone carbon chains, and addition polymerizable monomer, in the presence of at least 4% by weight of the monomer of benzoyl peroxide at a temperature in the range from about 110° C. to about 130° C., or under equivalent peroxide-type initiation, said blend having an oxirane oxygen content of no more than 3% and comprising:
(a) carboxylic acid-functional graft polymer,
(b) ungrafted carboxylic acid-functional addition copolymer, and
(c) ungrafted aromatic 1,2-epoxy diepoxide resin;
said graft polymer having an aromatic 1,2-epoxy diepoxide resin component formed from the reaction of epichlorohydrin with bisphenol A and having aliphatic backbone carbon chains, the diepoxide resin having a molecular weight in the range from about 4,000 to about 10,000 and an oxirane oxygen content not substantially above about 8%, onto which epoxy resin component is grafted at aliphatic backbone carbons thereof to the extent of at least about 2½ weight parts of said addition polymer component per 100 weight parts of said epoxy resin equivalent in the blend, an addition copolymer component formed from copolymerized units of methacrylic acid and of styrene in the relative ratios to each other of from 60 to 39, to about 80 to 19.5, the methacrylic acid furnishing carboxyl units consisting at least 5% by weight of said blend,
the Acid Number of said blend being in the range from about 80 to about 90,
the acid-functional polymers being ionized by said base, the ionization of the acid-functional polymers being sufficient to establish and to maintain the blend dispersed in the aqueous vehicle.

29. The coating composition of claim 28 that also contains up to about 10% by weight of said blend of an aminoplast cross-linker.

30. A coating composition in accordance with claim 28 wherein both said ungrafted addition copolymer and said addition copolymer component include units copolymerized therein of a lower alkyl ester of an acrylic acid in minor amount relative to the methacrylic acid and styrene.

31. A coating composition in accordance with claim 28 wherein the amount of epoxy resin in the initial reaction mixture is from 60% to 90% by weight of the mixture, and the amount of benzoyl peroxide therein is from 6% to 7% by weight of monomer.

32. A coating composition in accordance with claim 28 that includes an added quantity of addition copolymer from an extraneous source, the ionization of the acid-functional polymers being sufficient to establish all of the resin solids dispersed in the aqueous vehicle.

33. A coating composition in accordance with claim 2 wherein the ionizing base is fugitive under curing conditions for the coating and the aqueous vehicle includes a solvent system that is water-miscible, said base ionizing the acid-functional components of the resinous blend sufficiently to establish and to maintain the resinous blend dispersed in the aqueous vehicle.

34. A coating composition in accordance with claim 9 wherein the ionizing base is fugitive under curing conditions for the coating and the aqueous vehicle includes a solvent system that is water-miscible, said base ionizing the acid-functional components of the resinous blend sufficiently to establish and to maintain the resinous blend dispersed in the aqueous vehicle.

35. A coating composition in accordance with claim 24 wherein the aqueous vehicle includes a solvent system that is water-miscible.

36. A water-based coating composition comprising, in percentage by weight of the composition,
   (a) from about 60% to about 90% of a liquid vehicle and
   (b) from about 10% to about 40% by weight of the composition of solids;
   said solids comprising a blend of film-forming polymeric constituents having an oxirane content of no more than 3%, and being an associatively-formed mixture of:
   (a) carboxylic acid-functional graft polymer,
   (b) carboxylic acid-functional addition copolymer, and
   (c) ungrafted aromatic 1,2-epoxy diepoxide resin consisting of a glycidyl ether of a polynuclear polyhydric phenol;
   said graft polymer being an aromatic 1,2-epoxy diepoxide resin component in its ungrafted state consisting of a glycidyl ether of a polynuclear polyhydric phenol having a molecular weight of from about 4,000 to about 10,000 and having aliphatic backbone carbons onto which is grafted at aliphatic backbone carbons thereof carboxylic acid-functional addition copolymer component to the extent of at least about 2½ weight parts of said addition polymer component per 100 weight parts of said epoxy resin equivalent in the blend, said copolymer component comprising copolymerized untis of an acrylic acid and of a second ethylenically unsaturated monomer, which acid furnishes carboxyl groups that constitute at least 5% by weight of said blend, said graft polymer being formed by the reaction of a 1,2-epoxy diepoxide resin and ethylenically unsaturated monomer in the presence of at least 3% of benzoyl peroxide by weight based on monomer, or under equivalent free radical initiating conditions for the reaction including the use of a peroxide initiator, at a temperature in the range from about 110° C. to 130° C.,
   the epoxy resin component of said graft polymer and the ungrafted epoxy resin together constituting from 50% to 90% of said blend by weight, the Acid Number of said blend being in the range from about 30 to about 220, on a solids basis,
   said solids comprising from 6% to 39.9% of said blend and from 0.1% to 16% of a cross-linking resin;
   said liquid vehicle consisting of from 6% to 35% by weight of the composition of organic solvent, and from 25% to 80% of water, together with a sufficient quantity of a base that is fugitive at curing temperature for the composition to ionize the acid-functional polymers, the ionization being sufficient to establish the blend in the aqueous vehicle as a dispersion.

37. A water-based, sprayable coating composition for use for application as an internal sanitary liner for metal containers for beverages, comprising in percentages by weight of the composition,
   (a) from about 60% to about 90% of a liquid vehicle,
   (b) from about 9% to 29% of acidic resinous reaction product solids dispersed in the vehicle,
   (c) from about 1% to 10% of an added cross-linking agent, and
   (d) from about 2% to about 6% of a fugitive base that ionizes the resinous reaction product;
   said resinous reaction product being prepared by reacting together an initial reaction mixture of from 60% to 90% by weight of an aromatic 1,2-epoxy diepoxide resin consisting of a glycidyl ether of a polynuclear polyhydric phenol that has a molecular weight from about 4,000 to about 10,000, and ethylenically unsaturated addition polymerizable monomer comprising an acrylic acid, and benzoyl peroxide at a temperature from 110° C. to about 130° C. in an amount of at least 3% by weight based on the weight of the monomer, or under equivalent free radical initiating conditions for the reaction using a peroxide initiator, simultaneously to initiate the addition polymerization of said monomer through its ethylenic unsaturation and to produce an acidic graft polymer of addition polymer grafted to the epoxy resin that is characterized by the substantial absence of hydrolyzable functional groups other than terminal epoxy groups on the epoxy resin component of the graft polymer, the grafting being to the extent of at least about 2½ weight parts of said addition polymer component per 100 weight parts of said epoxy resin equivalent in the blend, the acrylic acid being present in the initial reaction mixture in sufficient quantity to impart an Acid Number to the resinous reaction product in the range from about 80 to about 90;
   said liquid vehicle consisting of water and up to 35% by weight of the coating composition of organic solvent,
   the ionization being sufficient to establish the solids in the liquid vehicle in dispersed form.

38. A coating composition in accordance with claim 37 where the cross-linker is an aminoplast resin and the liquid vehicle comprises water together with a mixture of 2-butoxy-ethanol-1 and n-butanol.

39. A composition in accordance with claim 38 wherein the resinous reaction product comprises:
   (a) carboxylic acid-functional graft polymer;
   (b) ungrafted carboxylic acid-functional addition polymer and
   (c) ungrafted epoxy resin;
   said graft polymer consisting of an epoxy resin component onto which is grafted at aliphatic backbone carbons thereof that have one or two hydrogens bonded thereto in the ungrafted state, an addition polymer component formed from said monomer, the acrylic acid being present in the monomer in sufficient quantity that the carboxyl group constitutes at least 5% by weight of the initial reaction mixture.

40. A process for preparing a curable resinous composition having an Acid Number of 30 to 220, comprising
   reacting together an aromatic diepoxide resin consisting of a glycidyl ether of a polynuclear polyhydric phenol, having a molecular weight of from about 350 to about 20,000, and wherein the epoxide groups are 1,2-epoxy groups, and addition polymerizable monomers having ethylenic unsaturation comprising from 10% to 80% by weight thereof of an acrylic acid,
   the diepoxide resin being present in sufficient quantity to provide from 10% to 90% by weight of the initial reaction mixture, in the presence of benzoyl peroxide at 110° C. to 130° C. in an amount of at least 3% by weight based on the weight of monomer, or under equivalent free radical initiating conditions for the reaction using a peroxide initiator, to initiate the simultaneous addition polymerization of said monomer through its ethylenic unsaturation and to produce a reaction product composition that comprises a graft polymer of addition polymer on the diepoxide resin that is characterized by the substantial absence of hydrolyzable functional groups other than terminal epoxy groups, the acid-functionality of the reaction product composition being sufficiently high to establish the composition as a dispersion in an aqueous medium containing a base that ionizes the acid-functional reaction product.

41. The process of claim 40 wherein the initial epoxy resin has a molecular weight in the range from 4,000 to 10,000 and is present in an amount from 50% to 90% by weight of the initial reaction mixture.

42. The process of claim 41 wherein the Acid Number of the product composition is from 80 to 90.

43. A process for producing a water-reducible curable sanitary coating composition which comprises:

reacting together an aromatic diepoxide wherein the epoxide groups are 1,2-epoxy groups and addition polymerizable monomers containing ethylenic unsaturation and comprising an acrylic acid, said acrylic acid comprising a proportion of said monomers of from 10% to 80% by weight thereof, said epoxy resin having a molecular weight of from about 4,000 to 10,000 and providing from 50% to 90% of the initial reaction mixture, in the presence of benzoyl peroxide at a temperature between about 110° C. and 130° C. in an amount of at least 3% by weight based on the weight of monomer, or under equivalent free radical initiating conditions for the reaction using a peroxide initiator, simultaneously to effect addition polymerization of the monomer through its ethylenic unsaturation, and to produce a resinous reaction product comprising a graft polymer of addition polymer on the diepoxide that is characterized by the substantial absence of hydrolyzable functional groups other than terminal epoxy groups, and thereafter dispersing the resinous reaction product in water with a base that is fugitive under curing conditions for the coating.

44. The process of claim 43 wherein said epoxy resin comprises modified epoxy resin having a positive oxirane content up to 8%.

45. The process of claim 44 wherein said epoxy resin is mixed with solvent, and the epoxy resin is a bisphenol A/epichlorohydrin reaction product.

46. A process for modifying a 1,2-epoxy resin with addition polymerizable monomer, to form a water-dispersible reaction product, comprising reacting together:

(a) an aromatic 1,2-epoxy diepoxide resin consisting of a glycidyl ether of a polynuclear polyhydric phenol that has aliphatic backbone carbons, and that has a molecular weight in the range from about 4,000 to about 10,000 and (b) addition polymerizable monomer containing ethylenic unsaturation and comprising an unsaturated carboxylic acid;

the epoxy resin constituting at least 60% by weight of the solids of the reaction mixture and up to 90% by weight thereof;

in the presence of benzoyl peroxide at an elevated temperature from 110° C. to 120° C. in an amount of at least 3% by weight based on the weight of monomer, or under equivalent free radical initiating conditions for the reaction using a peroxide initiator, to effect simultaneous addition polymerization of the monomer through its ethylenic unsaturation and to promote graft formation and grafting at aliphatic backbone carbon atoms of the epoxy resin that have either one or two hydrogens in the ungrafted state, to form graft polymer with addition polymer grafted to such aliphatic backbone carbons of the epoxy resin to the extent of at least about 2½ weight parts of said addition polymer component per 100 weight parts of said epoxy resin equivalent in the blend, and with ionizable carboxyl groups constituting at least 5% by weight of the reaction product solids, the acid functionality of the reaction product composition being sufficiently high to establish the product composition as a dispersion in an aqueous medium containing a base that ionizes the acid-functional composition, the product having an oxirane content of no more than 3%.

47. A process for forming a coating composition in an aqueous vehicle comprising suspending in water the reaction product of the process of claim 46 with an ionizing agent, the ionization of the acid-functional polymers being sufficient to establish the composition in the aqueous vehicle as a dispersion.

48. The process of claim 46 wherein the reaction product has an Acid Number in the range from 40 to 150.

49. A process for forming a water-reducible, curable coating composition in an aqueous vehicle comprising dispersing the reaction product of claim 48 in an aqueous vehicle with a base that is fugitive under curing conditions for the coating.

50. A process for preparing a curable resinous composition having an oxirane content of no more than 3% that is useful as a binder in a coating composition comprising reacting together a momomer mixture consisting of a major amount of methacrylic acid, a minor amount of styrene, and a lesser amount of a lower alkyl ester of acrylic acid or methacrylic acid, in the presence of an aromatic 1,2-epoxy diepoxide resin consisting of a glycidyl ether of a polynuclear polyhydric phenol, that has aliphatic backbone carbons, that furnishes a major portion and up to 90% of the solids content of the reactants, and that has a molecular weight of from about 350 to about 20,000, in the presence of benzoyl peroxide at 110° C. to 130° C. in an amount of at least 3% by weight based on the weight of monomer, or under equivalent free radical initiating conditions for the reaction using a peroxide initiator, to effect the simultaneous addition polymerization of the monomer through its ethylenic unsaturation and to produce an acid-functional reaction product composition that comprises a graft polymer of addition polymer on the epoxy resin that is characterized by the substantial absence of hydrolyzable functional groups other than terminal epoxy groups, the acid functionality of the reaction product composition being sufficiently high to establish the reaction product composition as a dispersion in an aqueous medium that contains a base that ionizes the acid-functional composition.

51. The process of claim 50 wherein the diepoxide resin has a molecular weight in the range from about 4,000 to about 10,000, and supplies from 60% to 90% by weight of the solids of the reactants, wherein the Acid Number of the reaction product is from 45 to 150, and wherein the reaction is conducted in the presence of a water-miscible solvent.

52. A process for forming a water-reducible, curable coating composition in an aqueous vehicle comprising dispersing the reaction product of claim 51 in an aqueous vehicle with a base that is fugitive under curing conditions for the coating.

53. A process for making a curable resinous composition having an oxirane content of no more than 3% that is useful as a binder in a coating composition comprising reacting together;
(a) an aromatic 1,2-epoxy diepoxide resin that is a reaction product of epichlorohydrin and bisphenol A, that has an average molecular weight in the range from about 4,000 to about 10,000, and that has aliphatic backbone carbon chains, and
(b) a mixture of monomers that contain ethylenic unsaturation and that are copolymerizable to form an addition polymer, said mixture consisting of a major amount of methacrylic acid, a minor amount of styrene, and a lesser amount of a lower alkyl ester of acrylic acid or methacrylic acid,
the epoxy resin constituting at least 50% by weight of the solids of the reaction mixture and up to 90% by weight thereof,
in the presence of benzoyl peroxide at a temperature in the range from about 110° C. to about 130° C. in an amount of at least 3% by weight based on the weight of monomer, or under equivalent free radical initiating conditions for the reaction using a peroxide initiator, simultaneously to effect addition polymerization of the monomer through its ethylenic unsaturation, and to promote graft formation and grafting at aliphatic backbone carbon atoms of the epoxy resin to form graft polymer with addition polymer grafted to such aliphatic backbone carbons of the epoxy resin;
by gradually adding the monomer mixture to the diepoxide resin with mixing and while maintaining the mixture of the reaction above about 110° C. up to about 130° C. in the presence of the free radical initiator;
the reaction being conducted in the presence of a water-miscible solvent system and
recovering from the reaction an associatively-formed reaction product mixture of a graft polymer in which an addition copolymer component formed from the copolymerization of the ethylenically unsaturated monomers is grafted onto aliphatic backbone carbons of the diepoxide resin that have either one or two hydrogens bonded thereto in the ungrafted state, and associatively-formed ungrafted addition polymer formed by the copolymerization of the ethylenically unsaturated monomers, said reaction product mixture also including ungrafted diepoxide resin, and having on a nonvolatiles basis an Acid Number of 45 to 150,
the acid-functionality of the reaction product composition being sufficiently high to establish and to maintain the product composition as a dispersion in an aqueous medium that contains a base that ionizes the acid-functional reaction product.

54. A process in accordance with claim 53 wherein the diepoxide resin of the graft polymer and the ungrafted diepoxide resin together furnish from 60% to 90% by weight of the reaction product mixture, solids basis, and wherein the amount of free radical initiator is at least 6% by weight benzoyl peroxide based on the monomer mixture.

55. A process for forming a water-reducible, curable coating composition in an aqueous vehicle comprising dispersing the reaction product of claim 54 in an aqueous vehicle with a base that is fugitive under curing conditions for the coating and that ionizes the acid-functional reaction product.

56. A resinous blend reaction product that is dispersible in an aqueous ionizing medium, said blend comprising ionizable graft polymer substantially free from hydrolyzable functional groups other than terminal epoxy groups, ungrafted addition polymer, and ungrafted epoxy resin, said graft polymer having an epoxy resin component, the epoxy resin in its ungrafted state consisting of an aromatic or aliphatic 1,2-epoxy diepoxide resin having a molecular weight of from about 350 to about 20,000, said epoxy resin component having an aliphatic backbone carbon chain onto which is grafted an addition polymer side chain component comprising polymerized units of ethylenically unsaturated monomer, said graft polymer and said ungrafted addition polymer being ionizable by reason of the presence of ionizable units incorporated in each of the addition polymer side chain component and in the ungrafted addition polymer, the ionizability being sufficient for establishment of the reaction product as a dispersion in an aqueous medium containing an ionizing agent, said graft polymer being formed by the reaction of the 1,2-epoxy diepoxide resin and ethylenically unsaturated monomer in the presence of at least 3% of benzoyl peroxide by weight based on monomer, or under equivalent free radical initiating conditions for the reaction including the use of a peroxide initiator, at a temperature in the range from about 80° C. to 200° C.

57. The resinous reaction product of claim 56 wherein said epoxy resin, in the ungrafted state, has a molecular weight in the range from about 4,000 to about 10,000, and wherein the epoxy resin component of the graft polymer and the ungrafted epoxy resin together furnish from 60% to 90% by weight of the resinous reaction product.

58. A resinous reaction product according to claim 57, wherein said addition polymer and said addition polymer component of the graft polymer are carboxylic acid-functional.

59. A resinous reaction product according to claim 58, wherein the ionizability is sufficiently high to establish and to maintain the resinous reaction product as a stable dispersion in an aqueous medium containing a basic ionizing agent.

60. A resinous reaction product according to claim 58, wherein the Acid Number is in the range from 45 to 150.

61. A resinous reaction product according to claim 60, wherein the Acid Number is in the range from 80 to 90.

62. A process for preparing an ionizable resinous reaction product that is dispersible in an aqueous ionizing medium which comprises:
reacting an aromatic or aliphatic 1,2-epoxy resin that has an aliphatic backbone carbon chain, that has a molecular weight of from about 350 to about 20,000, and that contributes from about 10% to about 90% by weight to the resinous reaction product, with addition polymerizable monomer containing ethylenic unsaturation in the presence of benzoyl peroxide at a temperature in the range from about 110° C. to 120° C., in an amount of at least 3% by weight based on the weight of monomer, or under equivalent free radical initiating conditions for the reaction including the use of a peroxide initiator, simultaneously to effect polymerization of the monomer through its ethylenic unsaturation and to form graft polymer with addition polymer component grafted to said aliphatic backbone carbon chain, at least some of said monomer units in said addition polymer component comprising ionizable groups;

the resinous reaction product obtained containing a sufficient number of ionizable groups for establishing the reaction product as a dispersion in an aqueous ionizing medium.

63. A process according to claim 62, wherein said epoxy resin is a reaction product of bisphenol A and epichlorohydrin.

64. A process according to claim 63, wherein said epoxy resin reactant has a molecular weight in the range from about 4,000 to about 10,000, and contributes from 60% to 90% by weight of said resinous reaction product, based on solids.

65. A process according to claim 63, wherein said ethylenically unsaturated monomer comprises an acrylic acid in an amount sufficient to produce a product having an Acid Number in the range 30 to 220.

66. A process according to claim 64 wherein said monomer comprises methacrylic acid and styrene.

67. A process according to claim 66 wherein carboxyl groups constitute at least 5% by weight of the resinous reaction product.

68. A process according to claim 66, wherein the acid is employed in an amount sufficient to produce a product having an Acid Number in the range from 45 to 150.

69. A process according to claim 68, wherein benzoyl peroxide is employed as the free radical initiator in an amount from 6% to 7% by weight based on the amount of ethylenically unsaturated monomer.

70. A resinous blend obtained by the process of claim 68.

71. A water-based coating composition comprising in percentages by weight of the composition:
 (a) from 60% to 90% of a liquid vehicle and
 (b) from 10% to 40% of solids comprising the resinous blend reaction product of claim 56,
 said liquid vehicle consisting of up to 35% by weight of the composition of organic solvent and further comprising an ionizing agent.

72. A water-based coating composition according to claim 71, wherein the resinous reaction product is that of claim 61.

73. A water-based coating composition according to claim 72 wherein the solids comprise the resinous reaction product in an amount of from 6% to 39.9% by weight of the composition, and a cross-linking resin in an amount of from 0.1% to 16% by weight of the composition.

74. A sprayable water-based coating composition according to claim 73 wherein the liquid vehicle comprises 70% to 90% of the composition and said resinous reaction product comprises 9% to 29% of the composition, by weight.

75. A water-based coating composition according to claim 74 wherein said cross-linking resin is present in an amount from 1% to 10% of the composition, and wherein said composition comprises from 2% to 6% by weight of a fugitive base that ionizes the resinous reaction product.

* * * * *